(12) United States Patent
Essenhigh et al.

(10) Patent No.: US 8,523,115 B2
(45) Date of Patent: Sep. 3, 2013

(54) SYSTEM, APPARATUS, PROGRAM PRODUCT, AND RELATED METHODS FOR PROVIDING BOUNDARY LAYER FLOW CONTROL

(75) Inventors: Katherine Anne Essenhigh, Laham, NY (US); Fengfeng Tao, Niskayuna, NY (US); Grover Andrew Bennett, Schenectady, NY (US); Matthew Boespflug, Clifton Park, NY (US); Robert C. Murray, Niskayuna, NY (US); Seyed Gholani Saddoughi, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 400 days.

(21) Appl. No.: 13/016,691

(22) Filed: Jan. 28, 2011

(65) Prior Publication Data

US 2012/0193483 A1 Aug. 2, 2012

(51) Int. Cl.
*B64C 23/00* (2006.01)

(52) U.S. Cl.
USPC .......................................................... 244/205

(58) Field of Classification Search
USPC .................. 244/199.1, 205, 200.1, 201, 203, 244/204
See application file for complete search history.

(56) References Cited

U.S. PATENT DOCUMENTS

| 6,805,325 | B1 | 10/2004 | Malmuth et al. |
| 7,380,756 | B1 | 6/2008 | Enloe et al. |
| 7,624,941 | B1 | 12/2009 | Patel et al. |
| 7,637,455 | B2 | 12/2009 | Silkey et al. |
| 2008/0023589 | A1 | 1/2008 | Miles et al. |
| 2008/0116808 | A1 | 5/2008 | McClure et al. |
| 2009/0212164 | A1 | 8/2009 | Osborne et al. |

FOREIGN PATENT DOCUMENTS

| DE | 10 2006 008 864 A1 | 9/2007 |
| EP | 1 995 173 A1 | 11/2008 |
| JP | 2007-317656 A | 12/2007 |
| WO | 2005120684 A1 | 12/2005 |
| WO | 2007133239 A2 | 11/2007 |
| WO | 2008016928 A1 | 2/2008 |
| WO | 2009053984 A1 | 4/2009 |

OTHER PUBLICATIONS

Grundmann, Sven and Tropea, Cameron; Article entitled "Experimental Transition Delay using Glow-Discharge Plasma Actuators"; Feb. 22, 2007; pp. 653-657; vol. 42; Springer-Verlag 2007.

(Continued)

*Primary Examiner* — Tien Dinh
*Assistant Examiner* — Keith L Dixon
(74) *Attorney, Agent, or Firm* — Bracewell & Giuliani LLP

(57) ABSTRACT

Systems, apparatus, and program product and methods for controlling boundary layer flow across an aerodynamic structure which can produce separate regions of flow structures at different strengths by means of dielectric-barrier-discharge (DBD) type plasmas, are provided. An example of such apparatus provides plasma regions that are capable of being individually controlled by voltage and/or frequency, and modulated for the purposes of flow control. The apparatus includes an electrode assembly fitted with electrodes on either side of a dielectric such that different electrode geometries and arrangements create isolated regions of plasmas which results in separate regions of flow structures. These regions may be further controlled and modulated by the use of electronic-switching to produce irregularly shaped flow structures and strengths including those having a primarily vertical component.

29 Claims, 21 Drawing Sheets

(56) References Cited

OTHER PUBLICATIONS

Kriegseis, J. and Dehler, T. and Pawlik, M. and Tropea, C.; Article entitled "Pattern-Identification Study of the Flow in Proximity of a Plasma Actuator"; Jan. 5-8, 2009; pp. 1-10; 47th AIAA Aerospace Sciences Meeting including the New Horizons Forum and Aerospace Exposition, Jan. 5-8, 2009, Orlando, FL.

Grundmann, Sven and Frey, Michael and Tropea, Cameron; Article entitled "Unmanned Aerial Vehicle (UAV) With Plasma Actuators for Separation Control"; Jan. 5-8, 2009; pp. 1-7; 47th AIAA Aerospace Sciences Meeting including the New Horizons Forum and Aerospace Exposition, Jan. 5-8, 2009, Orlando, FL.

Hanson, Ronald E. and Lavoie, Philippe, and Naguib, Ahmed M. and Morrison, Jonathan F.; Article entitled "Control of Transient Growth Induced Boundary Layer Transition Using Plasma Actuators"; pp. 1-6; Hanson and Lavoie (Institute for Aerospace Studies, University of Toronto, Canada.

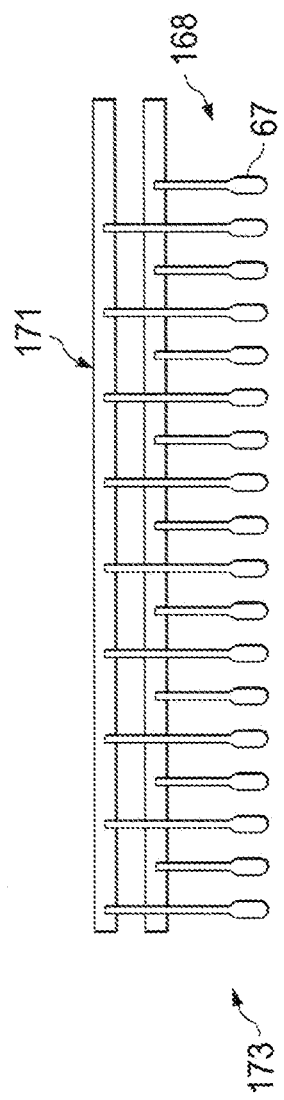
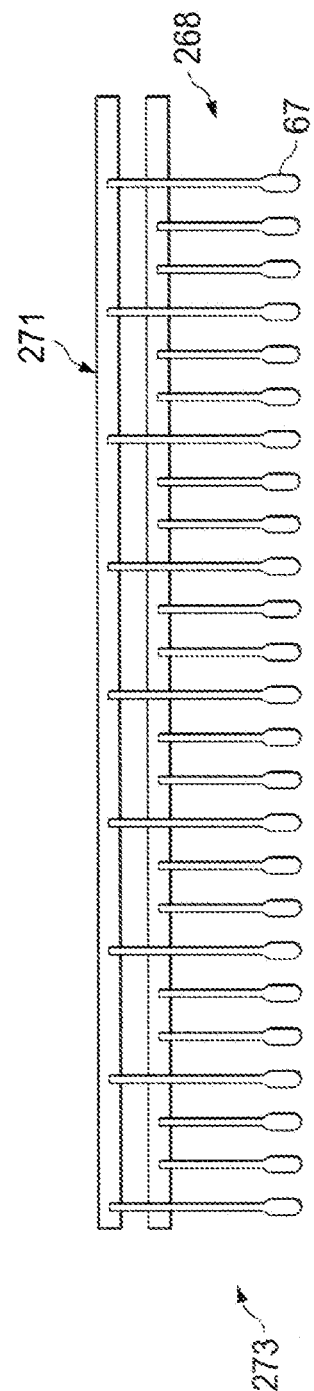

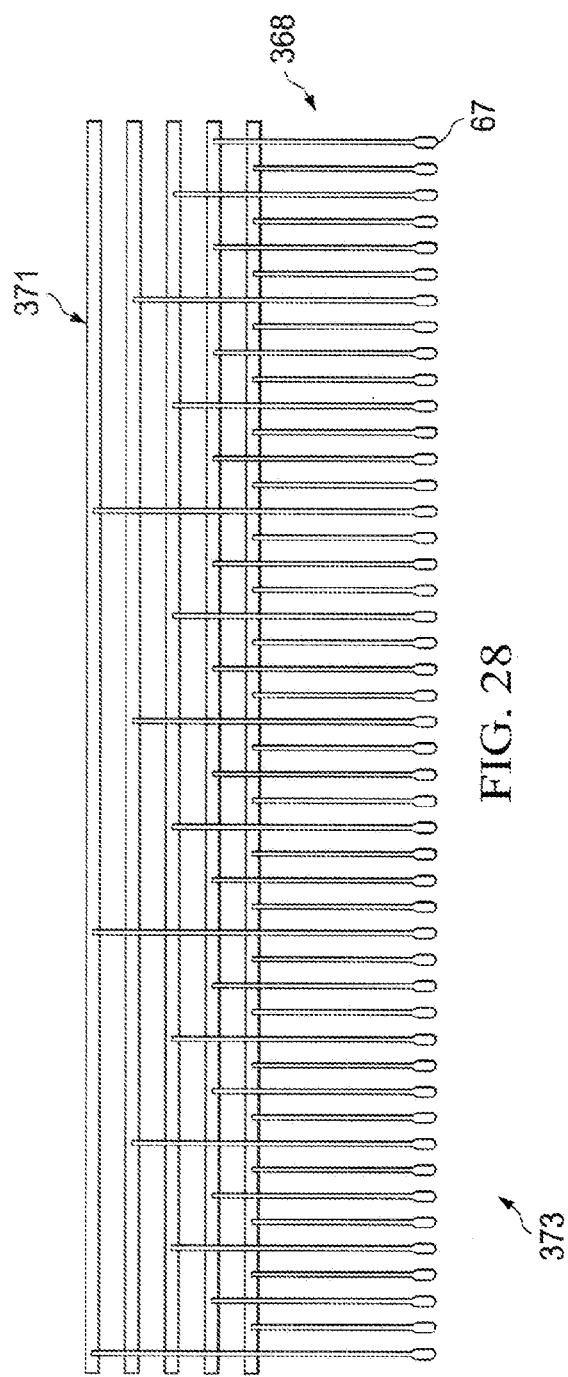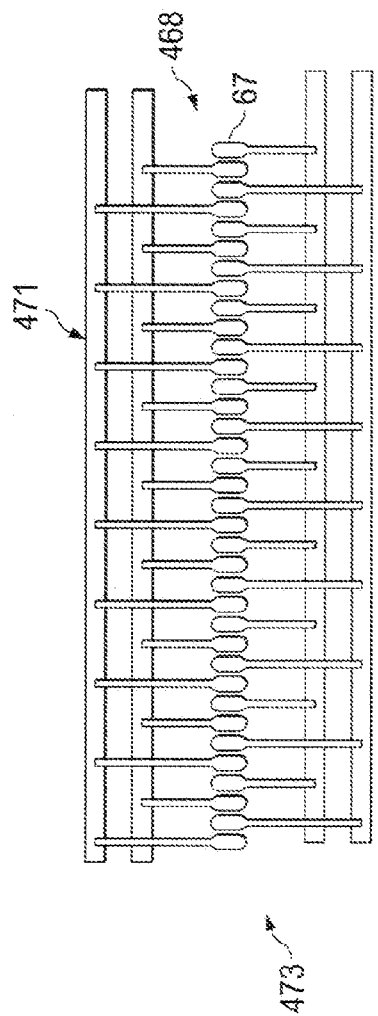

TYPICAL VOLTAGE/CURRENT WAVEFORM

WAVEFORM WITH DIFFERENT FREQUENCY

BURST OPERATION

FREQUENCY MODULATION

AMPLITUDE MODULATION

HYBRID MODULATION

SYSTEM, APPARATUS, PROGRAM PRODUCT, AND RELATED METHODS FOR PROVIDING BOUNDARY LAYER FLOW CONTROL

BACKGROUND OF THE INVENTION

1. Field of the Invention

The present invention relates generally to flow field management. More specifically, the present invention relates to systems, apparatus, program product, and methods for providing boundary layer flow control by the creation of separated flow structures using plasma actuators employing dielectric barrier discharge principles.

2. Description of the Related Art

Adverse fluid flows generated over aerodynamic surfaces can buffet and fatigue any downstream structures so exposed. Additionally, such flows can affect efficiency by increasing drag or resistance over the surface. Such adverse fluid flows can be generated at the fore body of an aircraft or other upstream structure, and damage control surfaces, engines, after body or empennage, nacelles, turrets, or other structures integrated into the airframe. Additionally, these adverse fluid flows can be ingested within engine air intakes or other like air inlets leading to poor performance and/or stalling of the aircraft engines.

In the past, aircraft components were designed to minimize the strength of adverse pressure gradient flaw fields to reduce the extent of or eliminate the separation of boundary layer flow from aircraft surfaces to reduce the destructive structural impact of separated flow on aircraft components and performance. This approach, however, limits design options and increases vehicle size, weight and cost. Alternatively, the components in the path of the adverse fluid flows were structurally hardened or replaced more frequently to avoid failures resulting from these stresses. Placing components, such as engines or control surfaces, in non-optimal positions in order to reduce these stresses often results in reduced vehicle performance. Similarly, adding structural weight to support increased stress loads caused by the flow field vortices also results in reduced vehicle performance.

One of the most commonly used methods to control local boundary layer separation, albeit within ducted systems, is the placement of vortex generators upstream of the layer separation within a natural fluid flow. Vortex generators are small wing like sections mounted on the inside surface of the ducted fluid flow and inclined at an angle to the fluid flow to generate a shed vortex. The height chosen for the best interaction between the boundary layer and the vortex generator has previously been the boundary layer thickness. The principle of boundary layer control by vortex generation relies on induced mixing between the primary fluid flow and the secondary fluid flow. The mixing is promoted by vortices trailing longitudinally near the edge of the boundary layer. Fluid particles with high momentum in the stream direction are swept along helical paths toward the duct surface to mix with and, to some extent, replace low momentum boundary layer flow. This is a continuous process that provides a source to counter the natural growth of the boundary layer creating adverse pressure gradients and low energy secondary flow accumulation. The devices, however, themselves cause drag which reduces the effectiveness of the devices.

Other potential solutions include the employment of active or passive control flows through mass injection using positive and/or zero mass devices to mitigate the effects of the adverse flow fields. These control jets manipulate the boundary layer, for example, through induced mixing between the primary fluid flow and the secondary fluid flow. The mixing is promoted by vortices trailing longitudinally near the edge of the boundary layer. Fluid particles with high momentum in the stream direction are swept along helical paths toward the aircraft surfaces to mix with and, to some extent replace low momentum boundary layer flow. This is a continuous process that provides a source to counter the natural deceleration of the flow near a solid surface in a boundary layer that can lead to flow separation in regions with adverse pressure gradients and low energy secondary flow accumulation. Mass injection devices utilizing a positive mass flow include, for example, passive jet spoilers which can utilize engine bleed air, ram air from an inlet or scoop, or an air/fluid pump. Such devices, however, require pneumatic/fluid conduits and/or manifolds to bring the control jets to regions requiring flow-control authority. Additionally, utilization of such devices result in added structural weight to supply and support the control jets, which results in reduced vehicle performance.

Various types of positive mass flow devices include combustion-driven jet actuators, which oxidize a gaseous fuel-air mixture. Specifically, such combustion-driven jet actuators include a combustion chamber that is filled with a combustible mixture which is then ignited, resulting in high pressures inside the chamber and mass expulsion through a chamber orifice. Besides the necessary fuel and air conduits, such devices also require a fuel storage capability, mechanical valves, and a means for igniting the fuel, which result in added structural weight to supply and support the control jets, which results in reduced vehicle performance.

Zero mass flow-capable devices include mechanical synthetic jets, single or dual bimorph synthetic jets, and spark jets. Synthetic jets, for example, which may be large scale devices or small scale Micro-fabricated Electro-Mechanical Systems (MEMS) devices, can be employed along an airfoil surface to control flow separation on the airfoil. A typical synthetic jet actuator includes a housing forming an internal chamber and an orifice in a wall of the housing. The actuator further includes a mechanism in or about the housing for periodically changing the volume within the internal chamber so that a series of fluid vortices are generated and projected into an external environment flow beyond the orifice of the housing. Various volume changing mechanisms include, for example, a reciprocating piston configured to move so that fluid is moved in and out of the orifice during reciprocation of the piston, and/or a flexible diaphragm forming one or more walls of the housing. In a similar device, the flexible diaphragm can instead be actuated by a piezoelectric actuator, such as, for example, one or more bimorph piezoelectric plates or other appropriate means connected by a flexible hinge or hinges.

Mechanical and bimorph synthetic jet actuators employing a flexible diaphragm typically include a control system is to create time-harmonic motion of the diaphragm. As the walls of the diaphragm (or diaphragms) move into the center of the chamber, the chamber volume decreases, and fluid is ejected from the chamber through a chamber orifice. As the fluid passes through the orifice, the flow separates at the sharp edges of the orifice and creates vortex sheets which roll up into vortices. These vortices move away from the edges of the orifice under their own self-induced velocity. As the vortices travel away from the orifice, they synthesize a jet of fluid, a "synthetic jet," through entrainment of the ambient fluid. As the walls of the diaphragm move outward with respect to the center of the chamber, increasing the chamber volume, ambient fluid is drawn in from large distances from the orifice and into the chamber. These devices add additional weight and/or complexity to the air foil design.

The other aforementioned zero mass-capable device, a spark jet, can also be employed, for example, along an airfoil surface in a similar fashion to that of the mechanical or bimorph synthetic jets to control flow separation on the airfoil. Akin to the mechanical or bimorph synthetic jets, a typical spark jet also includes a housing forming an internal chamber and a chamber orifice in a wall of the housing. In contrast to the mechanical or bimorph synthetic jet actuators, however, the spark jet includes electrodes to produce an electrical discharge to heat the fluid within the internal chamber, which causes the fluid to accelerate out of the chamber orifice. The walls of the spark jet are generally relatively rigid in order to withstand the chamber pressure resulting from the rapid heating of the fluid within the chamber, without significantly deforming. The inner chamber pressure is relieved by the exhaustion of the heated fluid through the chamber orifice. Fluid is returned to the inner chamber through a corresponding decrease in pressure caused by cooling of the chamber walls and the gases remaining within the internal chamber upon removal of the current to the electrodes. As with the mechanical and bimorph synthetic jet actuators, the spark jet actuators also add additional weight and/or complexity to the air foil design.

Other potential solutions for controlling boundary layer separation and reducing drag include the use of devices which form a suction at the surface of the airfoil. Such devices, however, result in increased costs, added weight, and increased complexity to the overall system.

Still other potential solutions include surface air heating, for example, through use of plasma surface discharges, and/or use of dielectric-barrier discharge ("DBD") type plasma actuators which produce a phenomenon often referred to as either an electrical or ionic wind across the surface of the airfoil. Plasma actuators, in their simplest form, consist of two electrodes, placed opposite of each other on a dielectric material. Discharges are created between the surface of the dielectric and the corresponding electrode by applying high frequency and high voltage. The resultant discharge creates a net displacement of the air that is near the dielectric surface layer; which creates a flow structure with a flow strength that is directly dependent on the applied power at the electrodes. There is an equal discharge created on the opposing electrode, which can be suppressed by isolating it from the surrounding air, such as, for example, by covering it with another electrode or an insulating material. The net result is an asymmetrical DBD with one electrode buried and not contributing to the net momentum, and the other electrode exposed on the surface being the single contributor to the momentum.

Velocity profiles of these simple DBD's have been researched and characterized by pitot-probe pressure measurements. Research by the inventors shows that the flow structure is generally uniform, directed away from the edge of the exposed electrode, at a maximum near the electrode, and with a pathway that follows the surface. Further, research by the inventors also shows that that these simple DBD constructs can impart a net momentum to the surrounding air producing a net force that acts on the DBD. Research by the inventors also shows that there is a small upward component to the velocity, but these constructs alone do not form velocities that are primarily upward. In addition, these constructs do not form individual regions that are individually addressable.

Moreau, in a paper titled "Air Flow Control by Non-Thermal Plasma Actuators," J. Phys D: Appl. Phys. 40 (2007) pp. 605-636, incorporated herein by reference in its entirety, describes a potential configuration of a DBD-based actuator consisting of two annular-shaped electrodes, with the first air-exposed and the second embedded in order to form a plasma jet actuator having a velocity perpendicular to the device. I.e., the device consists of two stacked ring or washer-shaped electrodes with the diameter of the bottom electrode being smaller than the diameter of the top electrode, but larger than the inner diameter of the top electrode. Notably, although it is believed by the inventors that such annular-shaped device would provide some functionality if arranged according to various delivery patterns according to various embodiments of the present invention and/or interfaced with control systems described hereinafter and if exposed to air flows with relatively low Reynolds numbers, it is expected that such would not be effective at higher Reynolds numbers. Recognized by the inventors is that at higher Reynolds numbers, efficient operation generally dictates that plasma actuators need to be larger and spaced at a much closer interval than at lower Reynolds numbers. As such, at a higher Reynolds number, the annular design would be less desirable, as the annular shape would be expected to dictate a requirement for spacing between actuators that would be larger than desired.

Accordingly, recognized by the inventors is the need for flow control systems, apparatus, devices, electrode assemblies, controllers, program product, and methods: which provide DBD-based plasma actuators that are capable of providing a vertical flow stream under flow conditions having relatively higher Reynolds number values and which are precisely shaped and positioned to provide for such flow conditions; which produce separate regions of flow structures at different strengths by means of dielectric-barrier-discharge (DBD) type plasmas; which provide plasma regions that are capable of being individually controlled by voltage and/or frequency, modulated and/or unmodulated, for the purposes of flow control; which provide electrode assemblies having electrodes on either side of a dielectric so that different electrode geometries and arrangements create isolated regions of plasmas which result in separate regions of flow structures that may be further controlled and modulated by the use of electronic-switching to produce irregularly shaped flow structures and strengths to adjust for different flow conditions; and which are precisely sized to withstand voltages necessary to achieve flow control.

Also recognized by the inventors is the need for methods of forming such apparatus, devices, electrode assemblies, and controllers, which include application of electrodes by techniques, such as sputtering, which minimize surface thickness and roughness, resulting in drag caused by the plasma actuators themselves, which allows for a specified electrode geometry and arrangements as well as precision to create opposing electrodes, which provides a desirable quality in flows across surfaces. Also recognized by the inventors is that additional sputtering of other materials could be used to suppress unwanted discharge regions, such as, for example, those caused by corners or other edges in the electrodes.

SUMMARY OF THE INVENTION

In view of the foregoing, various embodiments of the present invention advantageously provide flow control systems, apparatus, devices, electrode assemblies, controllers, program product, and methods which provide DBD-based plasma actuators having multiple plasma regions sized and shaped to provide a vertical flow stream and arranged in selectable patterns to adjust for changing Reynolds number values or Reynolds chord number values associated with various aerodynamic/hydrodynamic profiles. Various embodiments of the present invention also advantageously provide flow control systems, apparatus, devices, electrode assemblies, controllers, program product, and methods which produce separate regions of flow structures at different strengths by means of dielectric-barrier-discharge (DBD) type plasmas. Various embodiments of the present invention also advantageously provide plasma regions that are capable of being individually controlled by voltage and/or frequency, modulated and/or unmodulated, for the purposes of flow control. Various embodiments of the present invention also advantageously provide electrode assemblies having electrodes on either side of a dielectric so that different electrode geometries and arrangements create isolated regions of plasmas which results in separate regions of flow structures which may be further controlled and modulated by the use of electronic-switching to produce irregularly shaped flow structures and strengths.

An example of an embodiment of an apparatus for controlling boundary layer flow across an aerodynamic structure comprises a dielectric-barrier-discharge electrode assembly adapted to be connected to or otherwise integrated with the surface of an aerodynamic structure, such as, for example, a swept wing. The electrode assembly includes an insulating dielectric layer having an environmental fluid facing surface defining a top surface and an aerodynamic structure facing surface defining an bottom surface, a first or top electrode layer attached to or otherwise positioned in contact with the top surface of the insulating dielectric layer, and a second or bottom electrode layer attached to or otherwise positioned in contact with the bottom surface of the insulating dielectric layer so that the insulating dielectric layer is positioned between at least substantial portions of the first electrode layer and the bottom electrode layer.

The top electrode layer includes a plurality of oblong (e.g., pill shaped) voids extending through the layer, such that each of the oblong voids is substantially completely surrounded by a portion of the top electrode layer. The bottom electrode layer similarly includes a plurality of separate and spaced apart oblong (e.g., pill shaped) electrodes defining a plurality of secondary electrodes. Each of the secondary electrodes are positioned beneath a separate one of the plurality of oblong voids to complement the respective separate one of the plurality of oblong voids and positioned laterally substantially within confines of a normal extending along the perimeter of the respective complementing separate one of the plurality of oblong voids. That is, according to a preferred configuration, each secondary electrode is beneath and at least approximately centered laterally and within the confines of the respective complementing oblong void associated therewith when observed with a planar view. In this way, the combination of the portion of the top electrode layer surrounding each void and the associated secondary electrode creates a corresponding number of separate dielectric-barrier-discharge (DBD)-based plasma regions, with the set/array of plasma regions forming a plasma actuator. Each plasma region is dimensioned so that when activated, the respective plasma region functions to impart a net momentum and velocity to the surrounding environmental fluid which is primarily substantially normal to the portion of the dielectric layer immediately below the respective oblong void.

In order to provide an adequate amount of vertical velocity to the surrounding environmental fluid, according to a typical configuration, there must be adequate distance to allow for the surrounding fluid to be accelerated. The strength increases with increasing distance and increasing voltage. The minimal distance to adequately accelerate the fluid appears to be on the order of a millimeter.

Various embodiments of the present invention also advantageously provide methods of forming such apparatus, devices, electrode assemblies, and controllers, which include application of electrodes by techniques, such as sputtering, which minimize surface roughness resulting in drag caused by the plasma actuators themselves, which allows for a specified electrode geometry and arrangement, as well as precision to create opposing electrodes, which provides a desirable quality in fluid flows across aerodynamic surfaces.

An example of an embodiment of a method for controlling boundary layer flow across an aerodynamic structure comprises forming a dielectric-barrier-discharge electrode assembly, such as, for example, the electrode assembly described above, embedding or otherwise connecting the electrode assembly in/to a surface of an aerodynamic structure, and generating a plurality of irregular flow structures and strengths forming patterns having a net momentum and velocity to the surrounding environmental fluid having a substantial vertical component and/or additional horizontal flow structures combined therewith. The method can include the steps of applying a first electrode layer to a first surface of an insulating dielectric layer defining a top surface of the insulating dielectric layer, and applying a second electrode layer to a second surface of the insulating dielectric layer opposite the first surface defining a bottom surface of the insulating dielectric layer.

According to an embodiment of the method, the first electrode layer is configured with a plurality of oblong voids extending therethrough with each oblong void substantially completely surrounded by a portion of the first electrode layer, and the second electrode layer is shaped to form a plurality of separate and spaced apart oblong electrodes defining a plurality of secondary electrodes, whereby each of the plurality of secondary electrodes is positioned beneath a separate one of the plurality of oblong voids to complement the respective separate one of the plurality of oblong voids and is positioned laterally substantially within confines of a normal extending along the perimeter of the respective complementing oblong void. In a preferred configuration, the first electrode layer has a thickness of for example, 0.5 microns to reduce inherent disruption of the flow structure when the electrode assembly is in an inactive mode.

According to an embodiment of the method, the portion of the first electrode defining the perimeter of the extent of the respective oblong void, the complementing secondary electrode associated therewith, and a respective adjacent portion of the dielectric layer located between the surrounding portion of the first electrode and the complementing secondary electrode form a separate active plasma region of a plurality of active plasma regions of an active plasma actuator of the dielectric-barrier-discharge electrode assembly. According to this configuration, each plasma region is dimensioned so that when activated, the respective plasma region functions to impart a net momentum and velocity to the surrounding environmental fluid having a substantial vertical component normal to and extending away from the portion of the top surface of dielectric layer within the respective oblong void. As part of application of the bottom electrode layer, for example, an electrically switchable conductor array is also applied to the bottom surface of the insulating dielectric layer to provide electrical current to at least a subset of the plurality of secondary electrodes.

According to another embodiment of the method, the first electrode layer is further configured with a plurality of additional voids positioned along and extending from an outer perimeter edge of the first electrode layer and the second electrode layer is further configured with at least one portion positioned at least partially offset from a center of the additional plurality of voids to thereby form a second plurality of plasma regions, so that the plasma regions formed by the additional combination functions to impart a net momentum and velocity to the surrounding environmental fluid which is primarily substantially tangential to the portion of the dielectric layer immediately below the respective additional void. Various embodiments of the method also advantageously provide process steps that include additional sputtering of other materials to suppress unwanted discharge regions, such as, for example, those caused by corners in the electrodes.

Various embodiments of the present invention can advantageously mitigate cross-flow instabilities, which occur on swept wings, by providing an active means to maintaining laminar flow on swept-back wings. Transition from laminar flow to turbulent flow occurs earlier (upstream) on a swept back wing, then for a non-swept wing. This transition occurs due to the cross-flow instabilities that interact with each other, and grow. Advantageously, embodiments of the present invention can provide the flow over the wing with regions for the vortices caused by the cross-flow instability to attach, thus stabilizing the flow, reducing drag on aircraft and/or providing increased fuel efficiency.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIGS. 26-31 are planar views of various configurations of conductor arrays connected to secondary or bottom electrodes of an electrode assembly according to an embodiment of the present invention;

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Various embodiments of the present invention beneficially provide flow control systems, apparatus, devices, electrode assemblies, controllers, program product, and methods for controlling boundary layer flow across an aerodynamic structure, which can produce separate regions of flow structures at different strengths by means of dielectric-barrier-discharge (DBD) type plasmas. Various embodiments of the systems and apparatus, for example, can provide the plasma regions that are capable of being individually controlled by voltage and/or frequency, which can be modulated for the purposes of flow control. Various embodiments of the apparatus includes an electrode assembly fitted with electrodes on either side of a dielectric such that different electrode geometries and arrangements create isolated regions of plasmas which results in separate regions of flow structures. These regions may be further controlled and modulated by the use of electronic-switching to produce irregularly shaped flow structures and strengths. As will be described in more detail below, the electrodes can be applied to either side of the dielectric by a sputtering and/or photolithography techniques, which allow for the specified electrode geometry and arrangement, as well as precision in creating optimally spatially oriented opposing electrodes. Additional deposition of other materials can be used to suppress unwanted discharge regions associated with electrodes.

Figure 1:
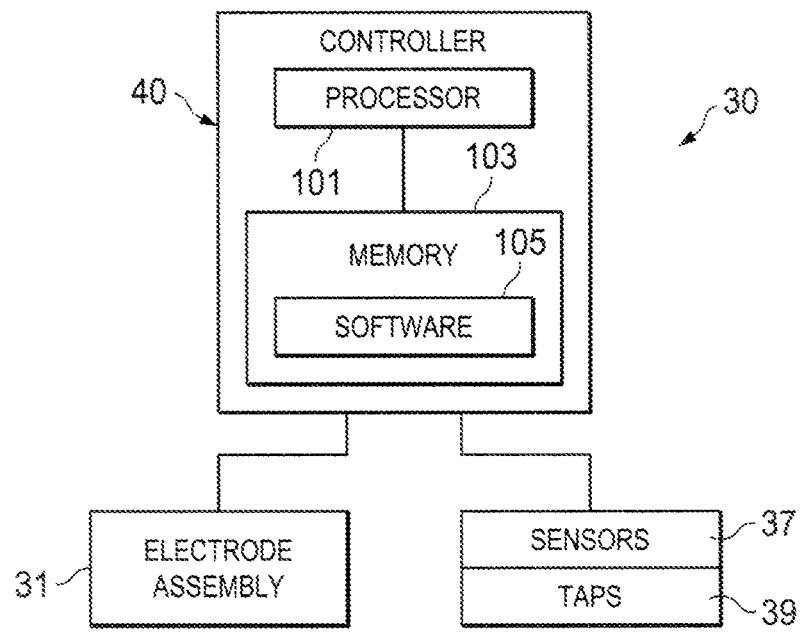
FIG. 1 is a schematic diagram of a general system architecture of an apparatus for controlling boundary layer flow across an aerodynamic structure according to an embodiment of the present invention.
Figure 2:
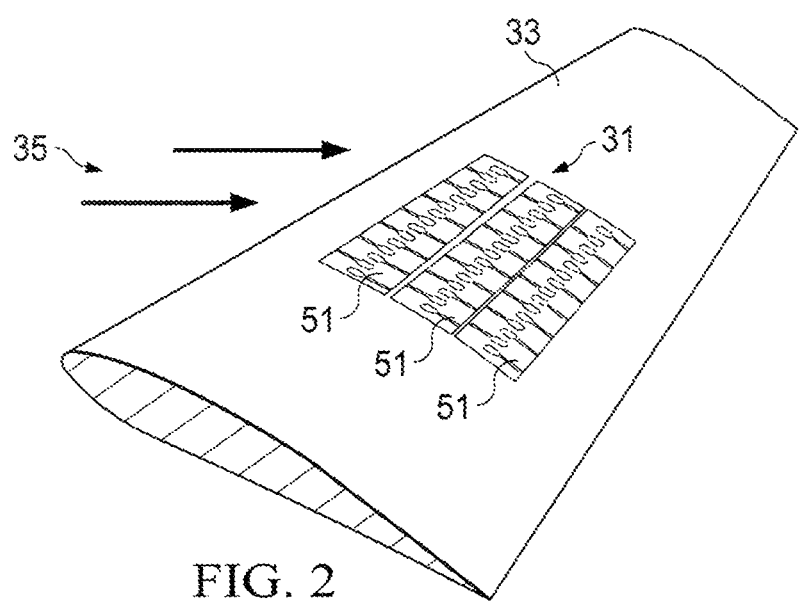
FIG. 2 is a perspective view of an airfoil including an electrode assembly positioned to provide flow control according to an embodiment of the present invention.
Figure 3:
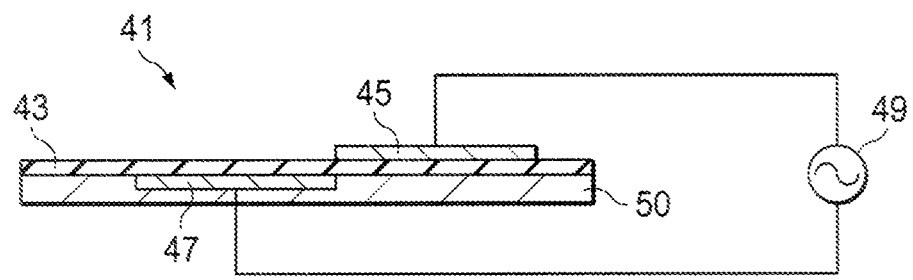
FIGS. 3-6 are cross-sectional views of a dielectric barrier discharge or "plasma" actuator configured with different sizes and electrode relational positions to provide a net momentum and velocity to the surrounding environmental fluid that is primarily tangent to the upper surface of the actuator.
Figure 4:
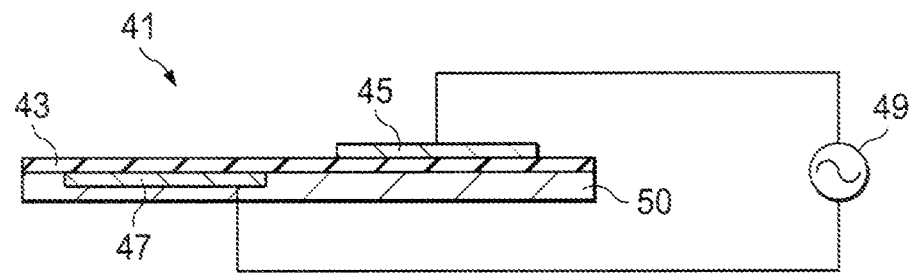
Figure 5:
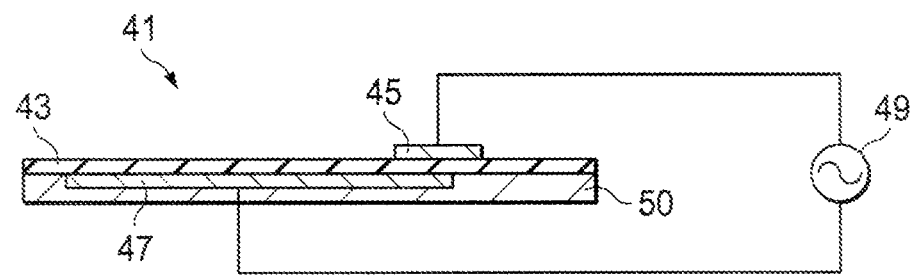
Figure 6:
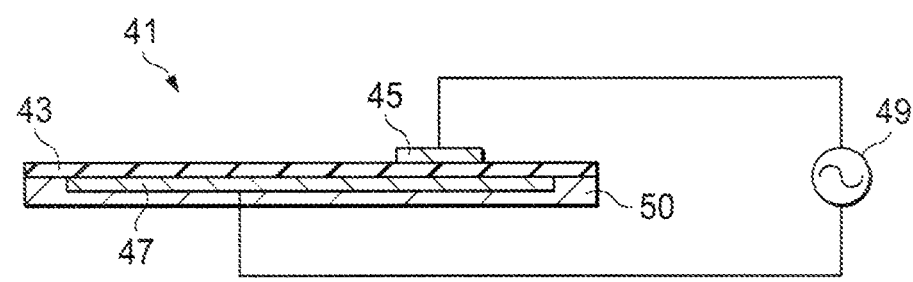

Specifically, as perhaps best shown in FIGS. 1-2, an exemplary embodiment of the present invention includes an apparatus (or system) 30 for controlling boundary layer flow across an aerodynamic structure, including at least one electrode assembly 31 connected to an airfoil 33 or other aerodynamic structure to provide flow control to a fluid flow 35 passing over the airfoil 33. Note, although the term "airfoil" is used for convenience, as used herein, the term represents the various other terms of aerodynamic and hydrodynamic structures. The apparatus 30 also includes sensors 37 and/or pressured taps 39 for determining an aerodynamics/hydrodynamic profile and/or the state of the fluid flow across the airfoil 33, and a controller 40 operably coupled to electrode assembly 31 and sensors 37 to manage the formation, geometry, and arrangement of various plasma regions having a primarily vertical flow component and/or various plasma regions having a primarily horizontal flow component, described in more detail later. Note, sensors 37 can include airspeed sensors, pressure altitude sensors, skin surface sensors, temperature sensors along with others as known to those of ordinary skill in the art. Pressure taps 39 can include pitot tubes, outside air vents, and/or others as known to those of ordinary skill in the art.

FIGS. 3-6 illustrate cross-sections of two examples of a dielectric barrier discharge ("DBD") or "plasma" actuator 41. The actuators 41 generally include a dielectric material 43, e.g., dielectric Kapton, with two opposing-electrodes 45, 47 positioned on either side of the dielectric material 43 in some relationship. Alternating current (AC) power source 49 delivers voltage and current to the device sufficient to cause a breakdown between the dielectric material 43 and the electrodes 45, 47. One electrode 47 may be suppressed or "buried" by covering it with some other dielectric material 50 (e.g., potting or silicone adhesive) to prevent breakdown from occurring on that side, or to act as a barrier between a support portion of the airfoil 33 and the actuator 41. Note, the electrodes 45, 47, can be of various sizes and can be positioned in various relations to each other as is shown in the FIGS. 3-6, depending upon the desired flow affect.

Figure 7:
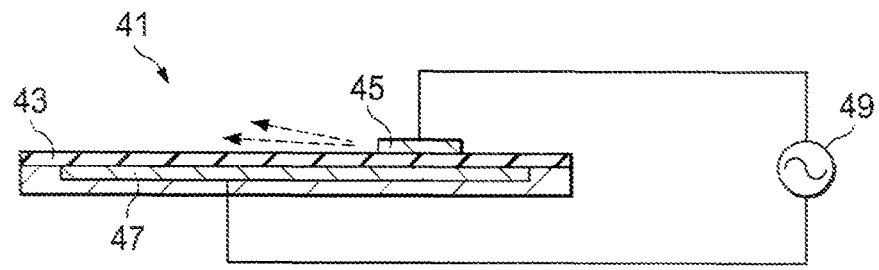
FIG. 7 is a cross-sectional view of a plasma actuator illustrating a resulting horizontal flow pattern taken along the 7 by 7 line of FIG. 8.
Figure 8:
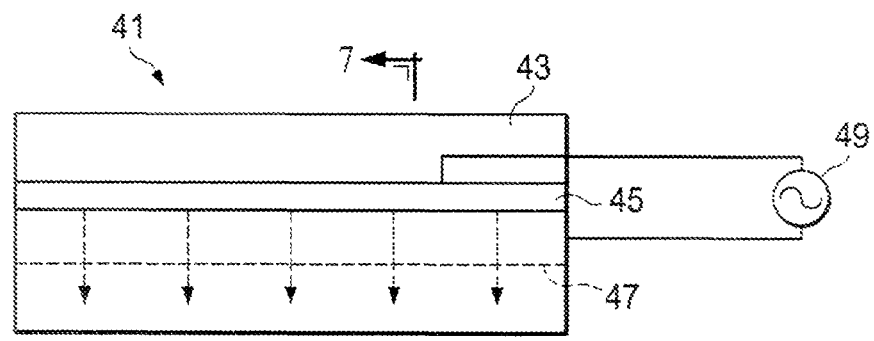
FIG. 8 is a planar view of the plasma actuator illustrated in FIG. 7.
Figure 9:
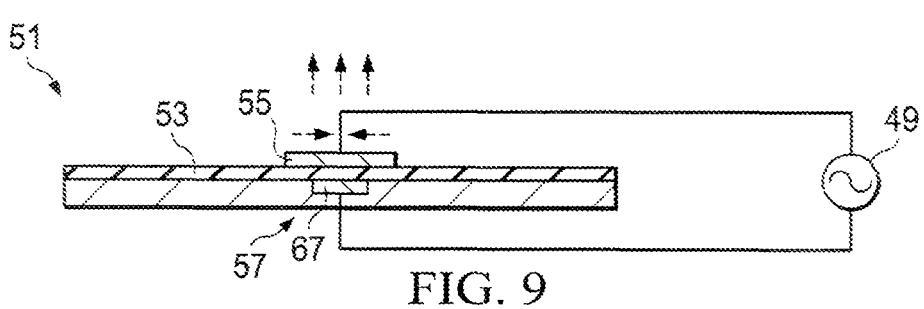
FIG. 9 is a cross-sectional view of a single plasma region of a plasma actuator illustrating a resulting vertical flow pattern produced by the plasma region of the plasma actuator according to an embodiment of the present invention taken along the 9 by 8 line of FIG. 10.

As perhaps best shown in FIGS. 7-8, in operation, discharges are created between the surface of the dielectric 43 and the corresponding electrode 45 by applying a high frequency and high voltage. The resultant discharge creates a net displacement of the air or other fluid 35 that is near the dielectric surface layer, which creates a flow structure with a flow strength that is directly dependent on the applied power at the electrodes 45. There is an equal discharge created on the opposing electrode 47, which is typically suppressed by isolating it from the surrounding fluid flow 35 by covering it with other dielectric material 50 or another electrode (not shown). The net result is an asymmetrical DBD-based plasma actuator 41 with one electrode 47 buried and not contributing to the net momentum or velocity, and the other electrode 45 exposed on the surface to be the single contributor to the momentum and velocity.

It is recognized, however, that different electrode geometries and arrangements can allow more complex and three-dimensional flow structures to be created. For example, upward jets of air or other fluid can be created by placing two DBD actuators 41 opposite of each other. It is surmised, however, that the areas adjacent the ends of the electrodes will have a significantly less desirable flow structure over that of the middle.

Referring to FIGS. 7-10, different geometries and arrangements on the primary side of the DBD actuator 41, 51, can allow more complex and different three-dimensional flow structures to be created. The DSB actuator 41 shown in FIGS. 7-8 can yield horizontal (linear) flow, while actuators having circular or oblong electrode regions such as DSB actuator 51 shown in FIGS. 9-10, can yield vertical flow (upward jets of air or other fluid). Further, vertical flow can be created by placing two DBD actuators 41 opposite of each other. As noted above, it is surmised, however, that the areas adjacent the ends of such electrodes, due to the existence of relatively sharp corners, will have a significantly less desirable flow structure over that of the middle.

The position of these actuators can be anywhere on the surface of the airfoil 33, such as, for example, on the leading or trailing edge of the airfoil 33. As such, these different flows can be introduced into the boundary layer, where necessary.

As perhaps best shown in FIGS. 9-15, through testing, it has been determined that upward jets of air or other fluid having a highly desirable flow structure can be created by creating an electrode 55 having an oblong shaped (e.g., oval or pill shaped) void 61 (FIGS. 9-13), while surface flows can be created by the careful placement of additional electrodes (not shown) offset from the top electrode 45, 55, additional non-oval voids 63 (FIG. 13), and/or careful placement of portions of the bottom electrode 47, 57.

Figure 10:
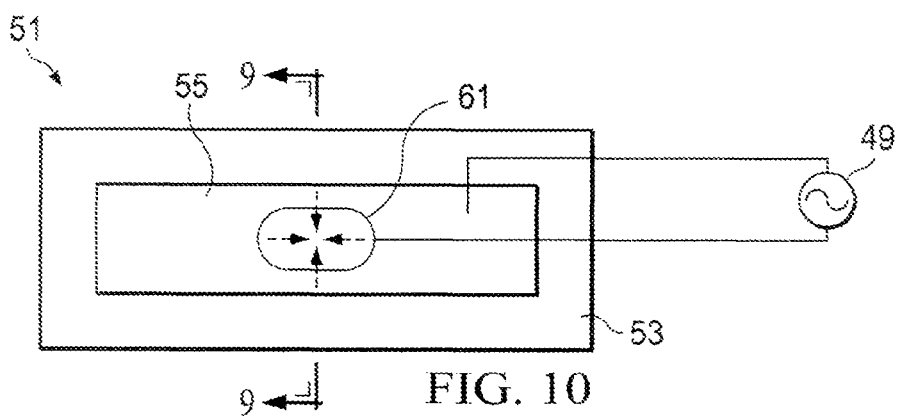
FIG. 10 is a planar view of the single plasma region of the plasma actuator illustrated in FIG. 9 according to an embodiment of the present invention.
Figure 11:
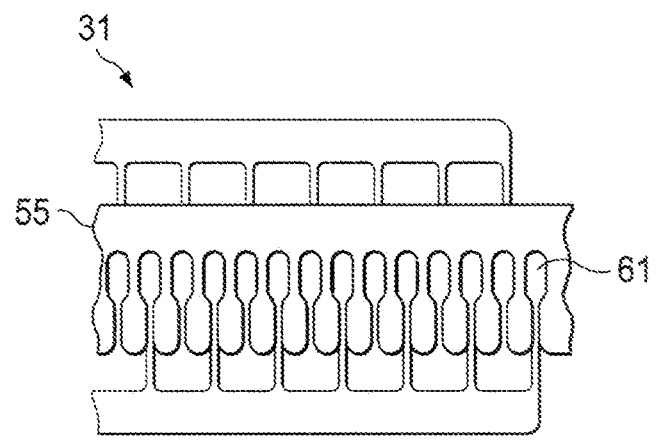
FIG. 11 is top planar view of an electrode assembly according to an embodiment of the present invention.

FIGS. 9-13 illustrates an exemplary configuration whereby the first or top electrode layer 55 of the actuator 51 (e.g., FIGS. 11, 13) is in the shape of an elongate bar of e.g., gold material, forming electrode 55 having one or more voids 61 shaped in the form of a pill extending therethrough, and the second or bottom embedded electrode layer 57 (e.g., FIG. 12) is in the shape of a set of jaws including one or more separate and spaced apart oblong electrodes 67 positionally matching and/or otherwise complementing the plurality of voids 61. Specifically, FIG. 10 illustrates an actuator 51 having a single plasma region located at 61, whereas FIG. 11 illustrates an electrode assembly 31 having multiple plasma regions (e.g., comprising a multiple number of voids 61 complemented by a corresponding multiple number of electrodes 67) consolidated into a single structure.

Figure 13:
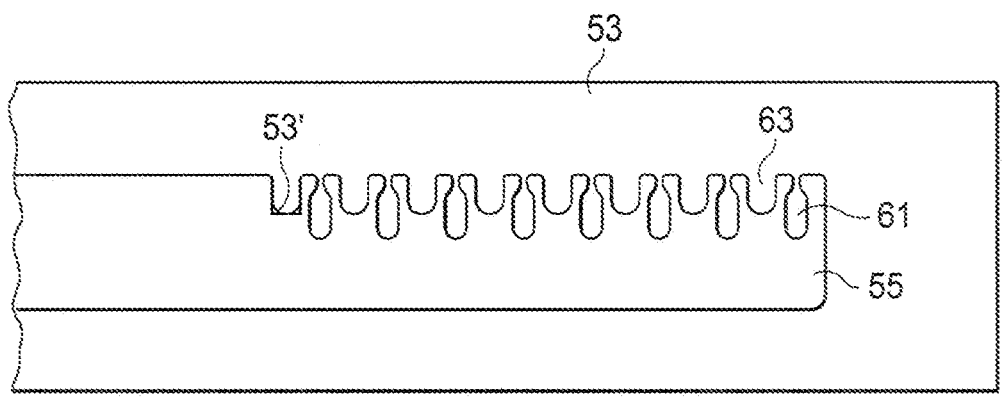
FIG. 13 is a top planar view of a hybrid electric assembly including plasma regions that produce both a vertical flow pattern and a horizontal flow pattern according to an embodiment of the present invention.
Figure 16:
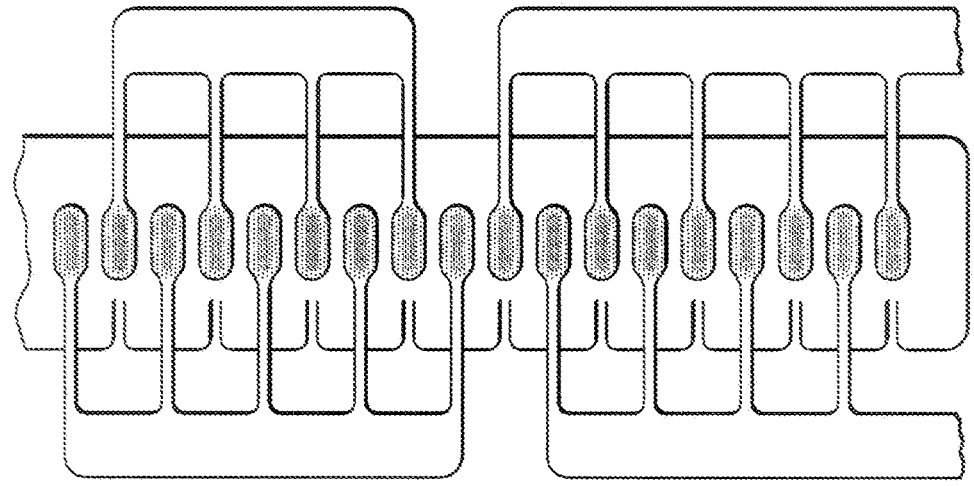
FIGS. 16-22 are planar views of representations of additional vertical flow patterns produced by actuation of different combinations of plasma regions of the electrode assembly illustrated in FIG. 11 according to an embodiment of the present invention.

FIG. 13 illustrating a hybrid actuator configuration including additional voids 63 extending through portions of the upper electrode 55, and additional dielectric material 53' positioned in contact with the top surface of the insulating dielectric 53 and between adjacent portions of the electrode 55 to suppress unwanted discharge regions, for example, caused by corners or adjacent straight edges in the electrode 55. According to the illustrated configuration, additional dielectric material 53' is provided in the shape of a mechanical fillet.

In the preferred configuration, the voids 61 and electrodes 67 are pill shaped to provide increased electrode area over that of an annular (and circular) arrangement, and thus, an increased capacity to withstand a higher voltage and produce a larger momentum and velocity effect. According to the preferred configuration, the length of each oblong void 61 is substantially larger than the length of the dielectric layer-facing surface of the associated complementing secondary electrode 67, and the width of each oblong void 61 is substantially larger than the width of the dielectric layer-facing surface of the associated complementing secondary electrode 67. A larger width can result in a higher velocity and stronger jet. Increasing the applied voltage can also result in a higher velocity. A larger voltage, however, may generally require a thicker dielectric and at certain value and beyond, depending on the thickness of the dielectric and/or frequency, can result in undesirable discharging on the edges of the electrodes.

Further, each oblong void 61 is configured so that the effective spacing between each of the oblong voids as a result of pattern selection can be decreased as the Reynolds chord number increases.

Still further, according to the preferred configuration, each separate oblong void 61 is oriented approximately parallel to each other of the oblong voids 61 in a particular electrode row and separated by a distance of between approximately 2.0 mm and 2.75 mm. In a specific configuration, and the width of each oblong void is preferably larger than approximately 1 mm. More generally, the width of each oblong void will be selected to be smaller than approximately 1.5 mm to accommodate a denser distribution of actuators for use in flows having higher Reynolds chord numbers and larger than approximately 1 mm to provide an adequate distance to achieve a desirable vertical velocity/acceleration. Note, in certain circumstances, the minimum can be as low as 0.5 mm. Other width value ranges are, however, within the scope of the present invention.

Additionally, although a larger electrode surface area generally allows a higher voltage to be applied, in an exemplary configuration, the surface area of each bottom electrodes 67 is smaller than the area of each of the voids 61 in order to functionally provide increased flow velocity, but as should be understood by one of ordinary skill and the art, is nevertheless large enough and thick enough so as not to burn up due to the voltage needed to achieve the desired flow velocity.

Figure 15:
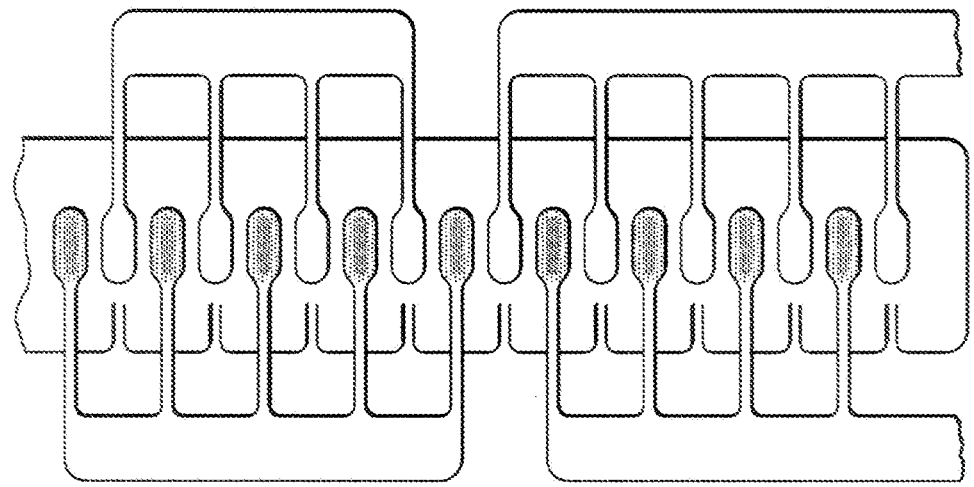
FIG. 15 is a planar view of a representation of a vertical flow pattern produced by actuation of every other one of the plasma regions of the electrode assembly illustrated in FIG. 11 according to an embodiment of the present invention.
Figure 14:
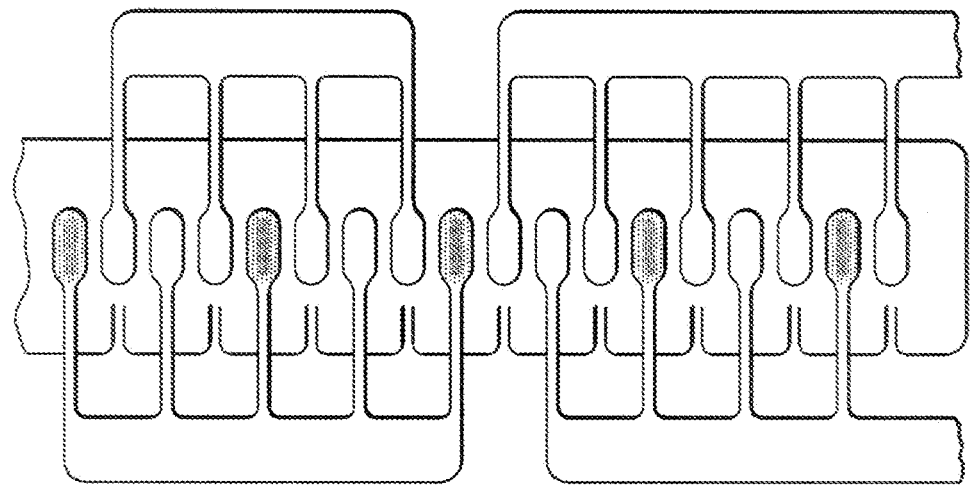
FIG. 14 is a planar view of a representation of a vertical flow pattern produced by actuation of each of the plasma regions of the electrode assembly illustrated in FIG. 11 according to an embodiment of the present invention.
Figure 19:
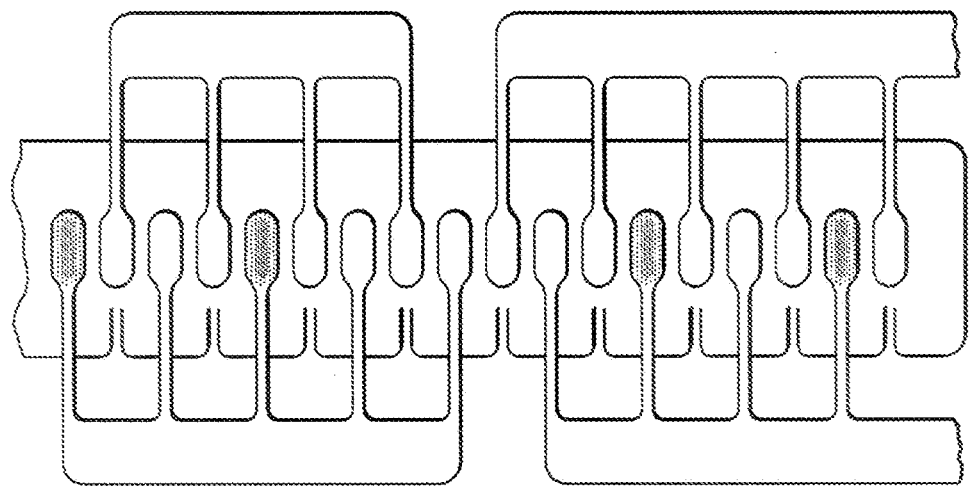
Figure 18:
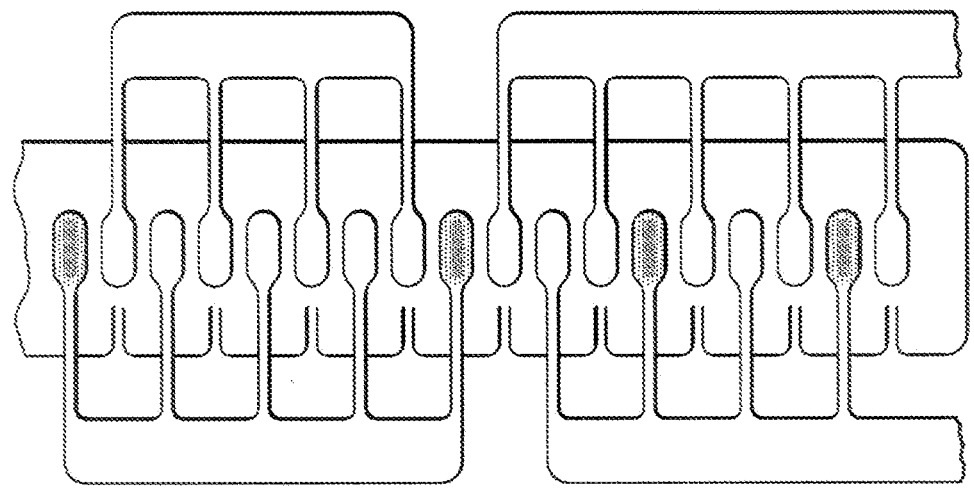
Figure 17:
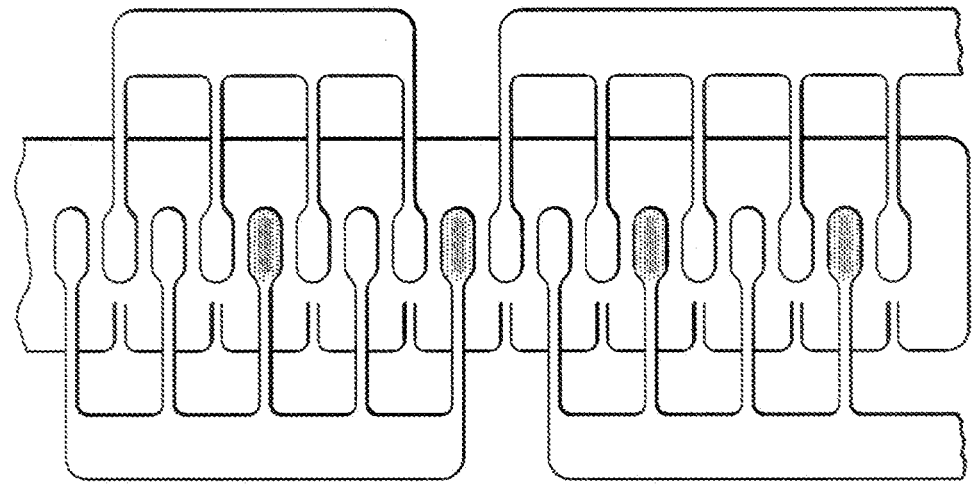
Figure 22:
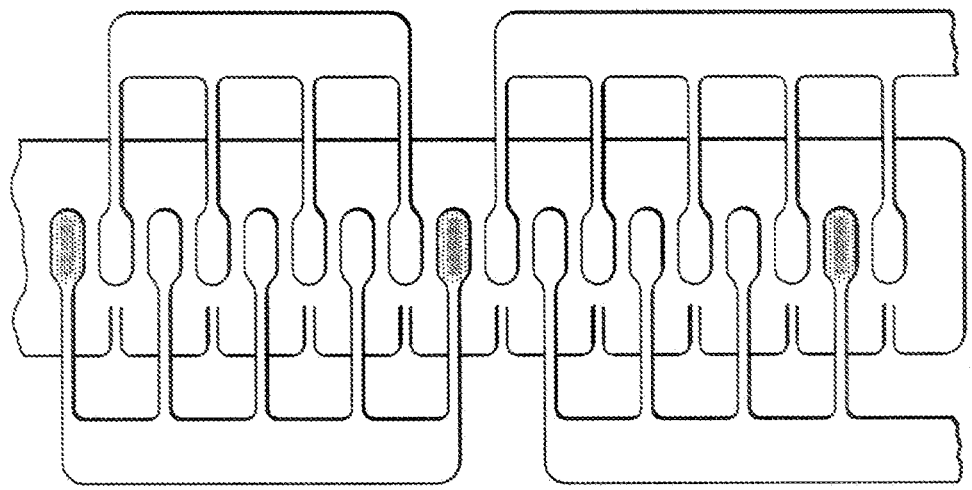
Figure 21:
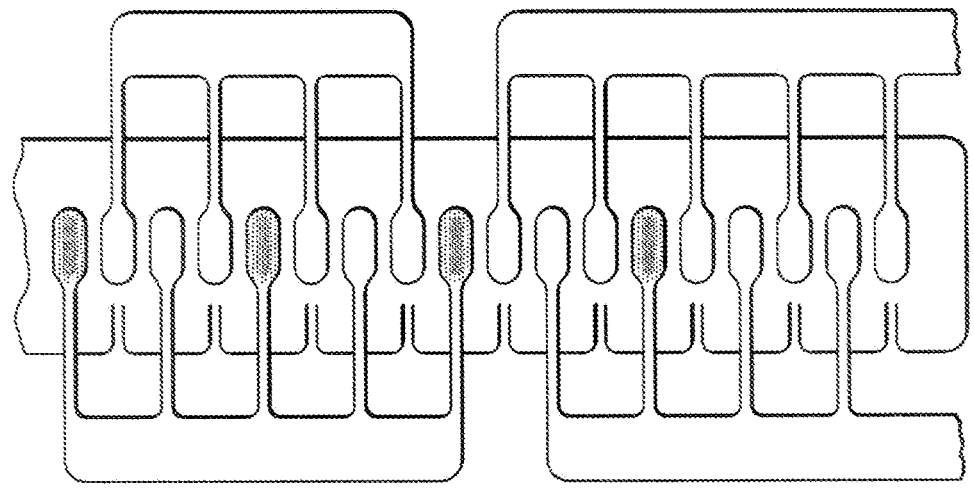
Figure 20:
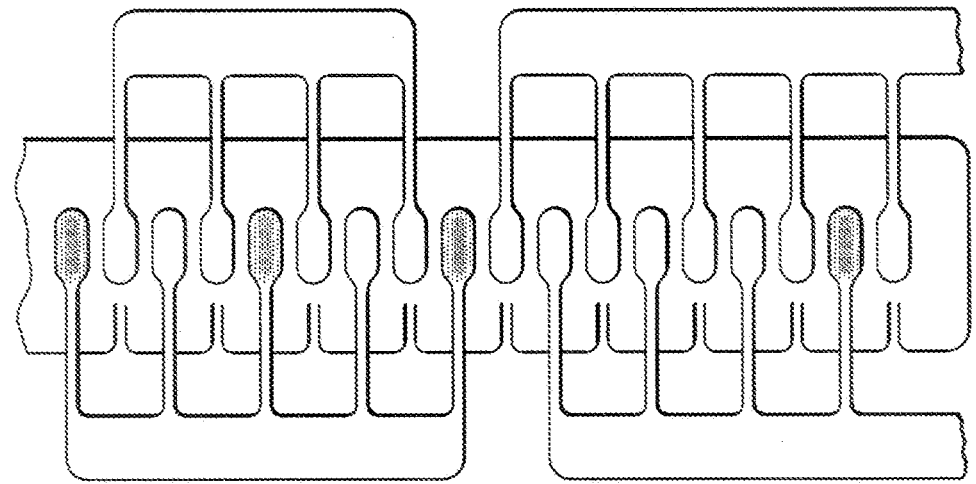

FIG. 14 illustrates the vertical "jets" that occur in the center of the pill shaped "ovals" of each of the voids 61 of the electrode assembly 31 according to the illustrated configuration, when each of the plasma regions of the electrode assembly 31 are activated. FIG. 15 illustrates the "jets" pattern produced by activation of every other plasma region. FIGS. 16-22 illustrate additional vertical jet configurations (unique patterns) produced by various electrode plasma region activation combinations, which can be generated by controller 40, described later, in response, for example, to various sensed flow conditions.

Figure 23:
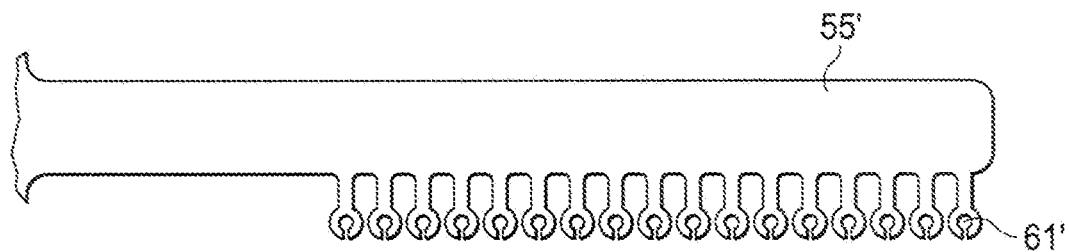
FIG. 23 is top planar view of an electrode assembly having a plurality of "Y" shaped top electrodes according to an embodiment of the present invention.
Figure 24:
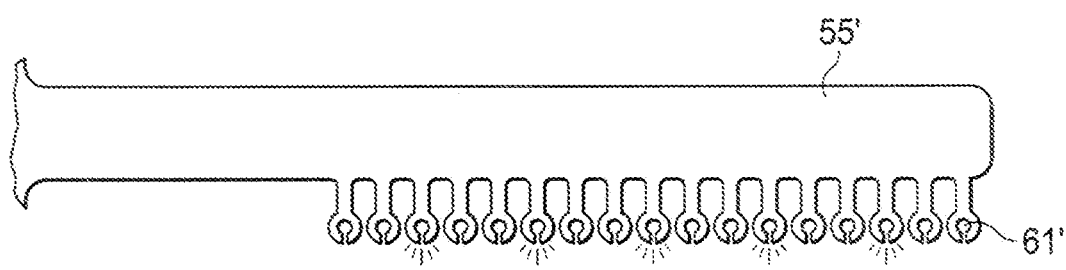
FIG. 24 is a planar view of a representation of a vertical flow pattern produced by actuation of each of the plasma regions of the electrode assembly illustrated in FIG. 23 according to an embodiment of the present invention.
Figure 25:
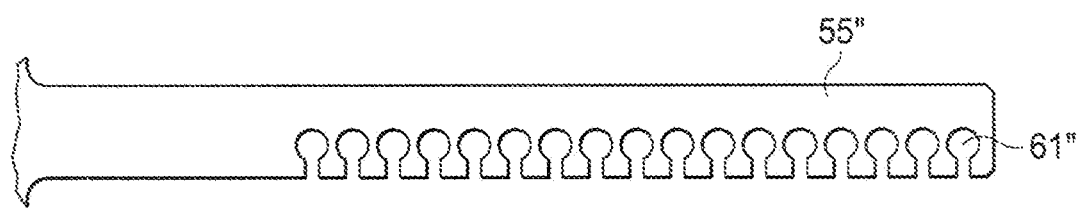
FIG. 25 is top planar view of an electrode assembly having a top electrode including a plurality of open circle shaped voids according to an embodiment of the present invention.
Figure 30:
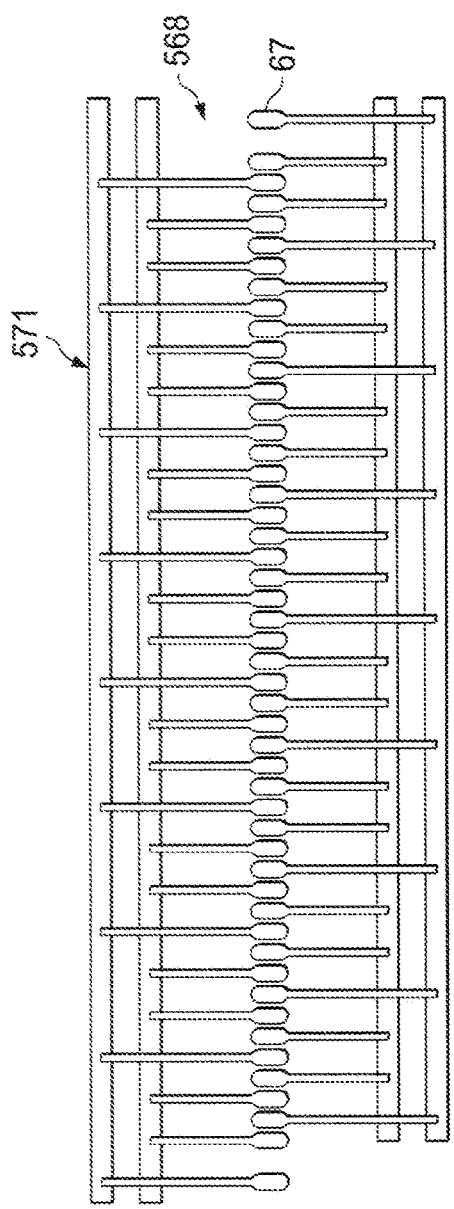

FIGS. 23-24 illustrate alternative void configurations such as, for example, a closed "Y" configuration having a circular shaped void 61' extending away from main body portions of the top electrode 55' and associated "jets" pattern with all Ys activated. FIG. 25 illustrates open-circle shaped voids 61" extending through the main body portion of the top electrode 55".

Figure 12:
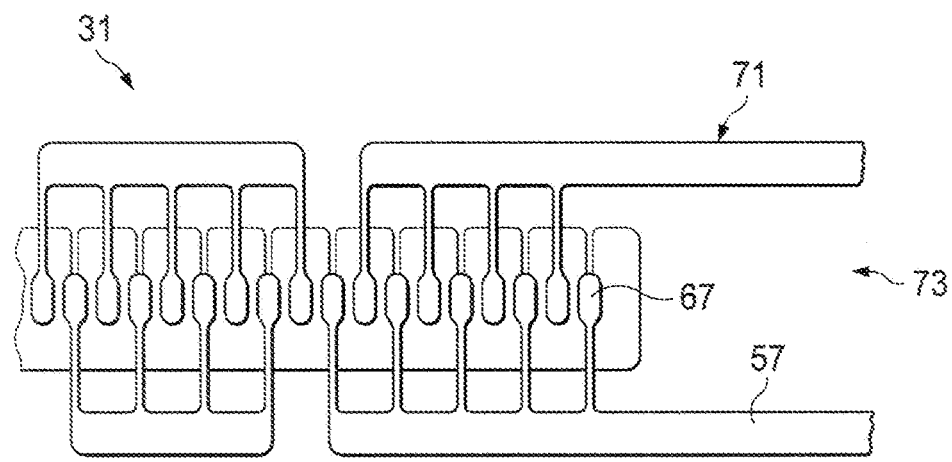
FIG. 12 is bottom planar view of an electrode assembly according to an embodiment of the present invention.
Figure 32:
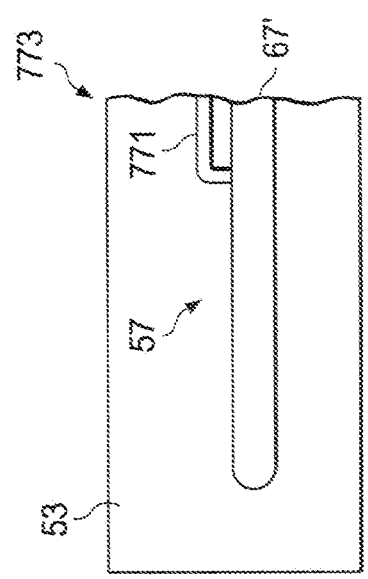
FIG. 32 is a planar view of a single strip of electrode material positioned to form a secondary or bottom electrode of the electrode assembly according to an embodiment of the present invention.
Figure 31:
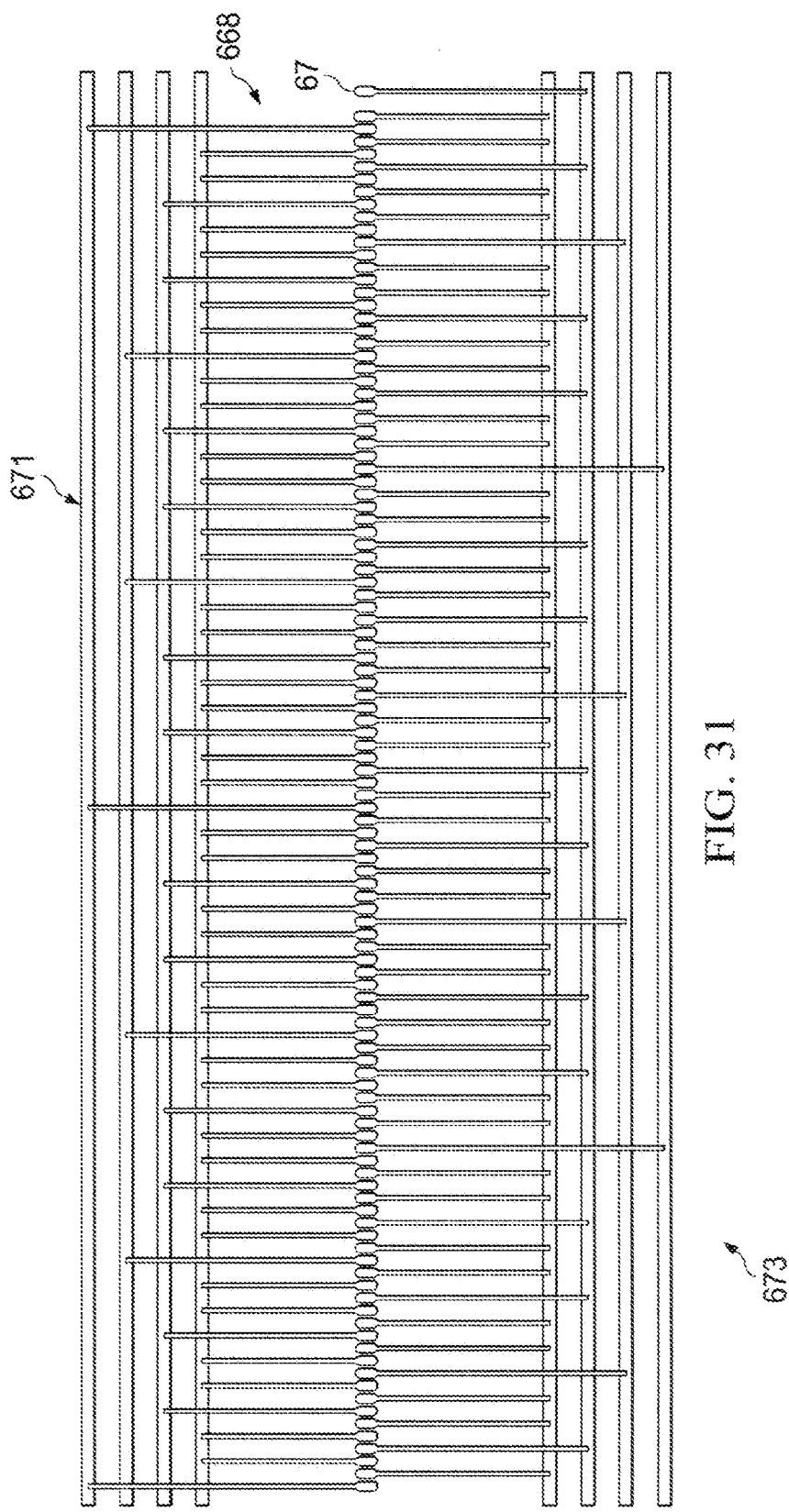
Figure 33:
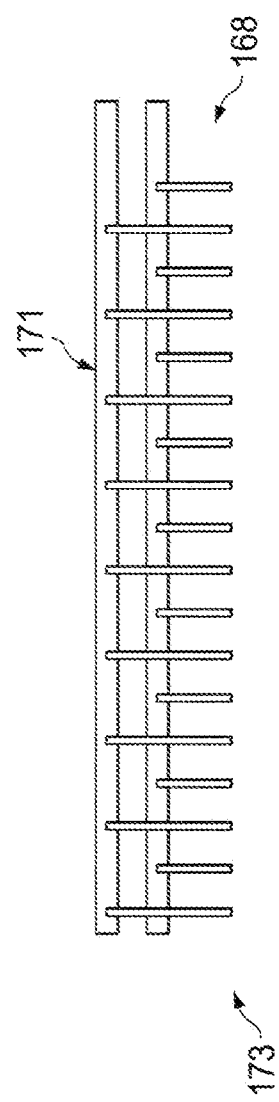
FIGS. 33-39 are planar views of various configurations of conductor arrays having electrode facing portions which replace the secondary or bottom electrodes of an electrode assembly according to an embodiment of the present invention.
Figure 34:
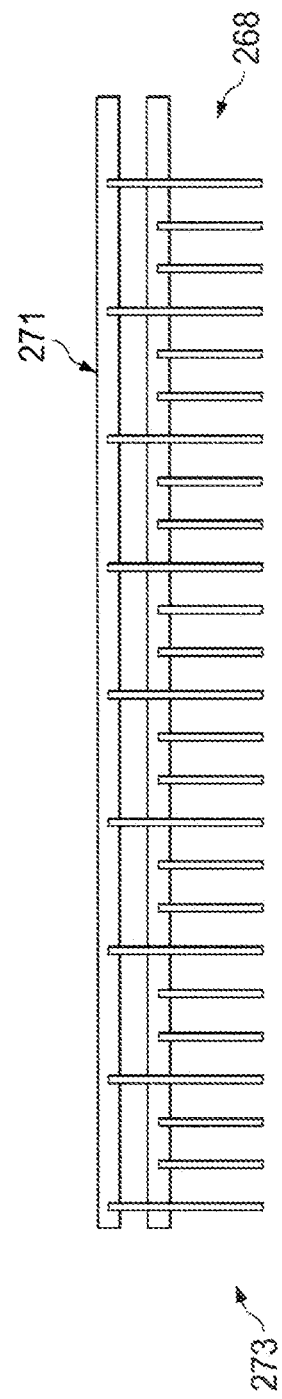
Figure 35:
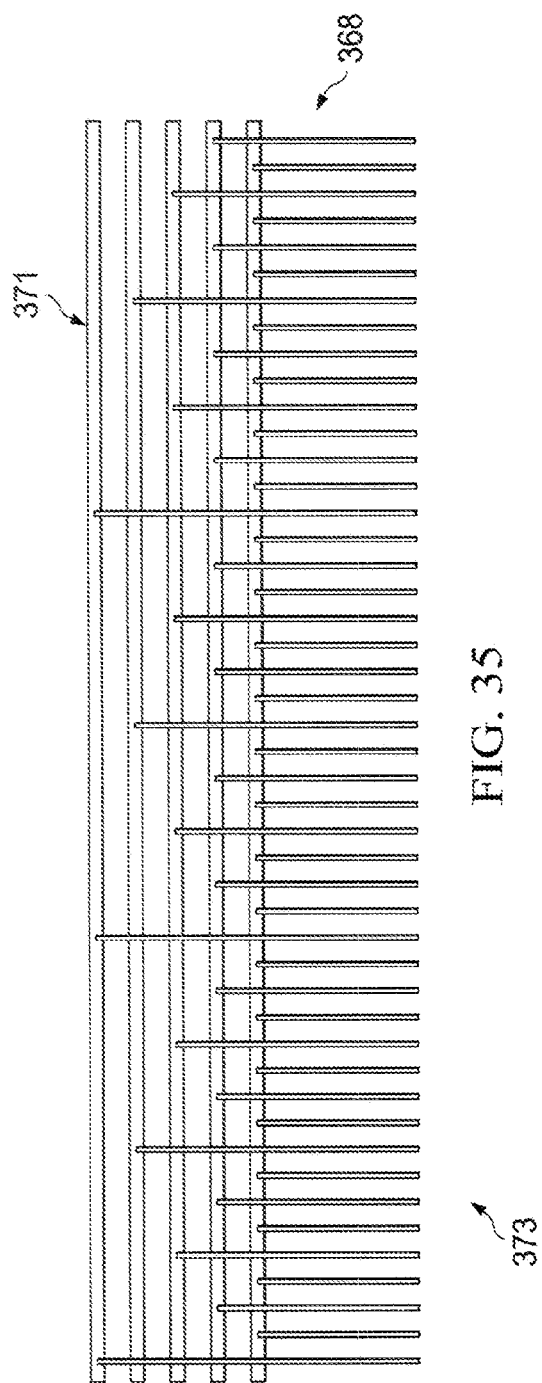
Figure 36:
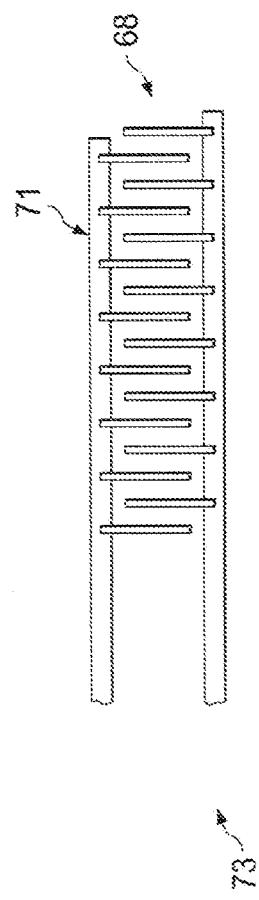
Figure 37:
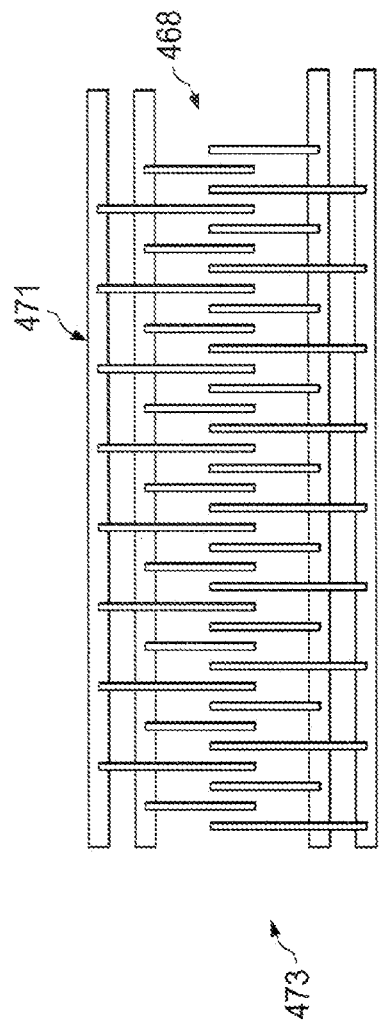
Figure 38:
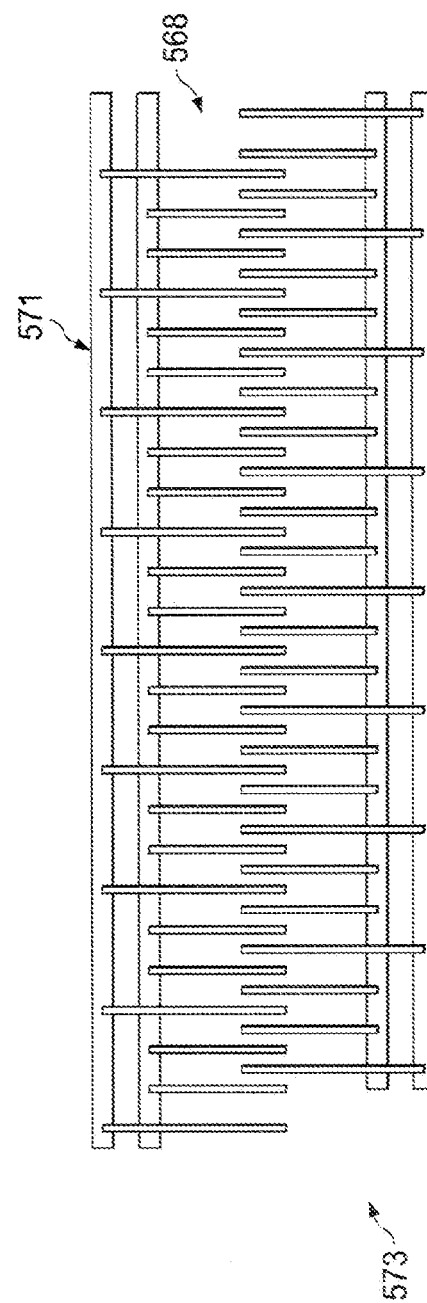
Figure 39:
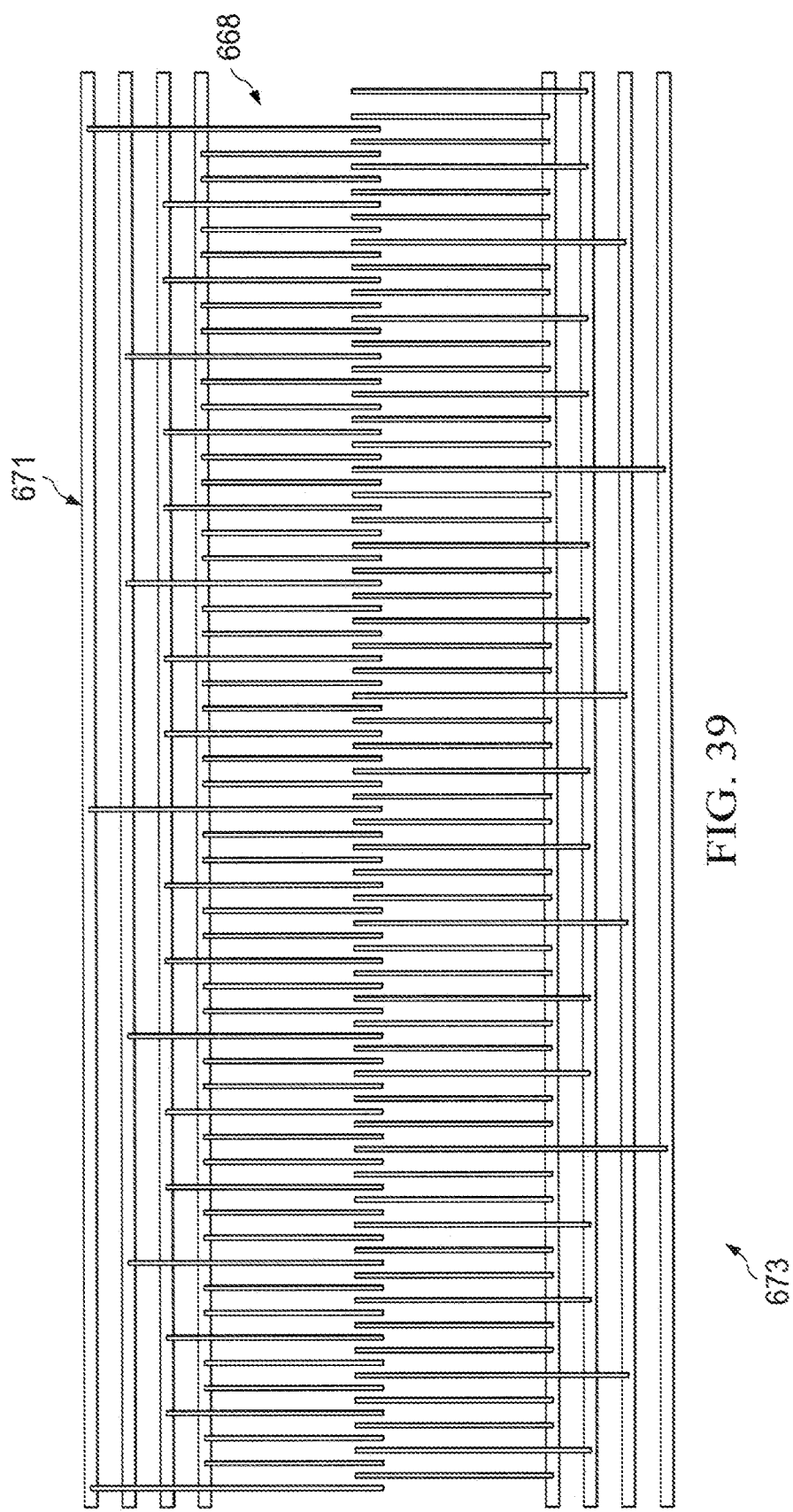
Figure 40:
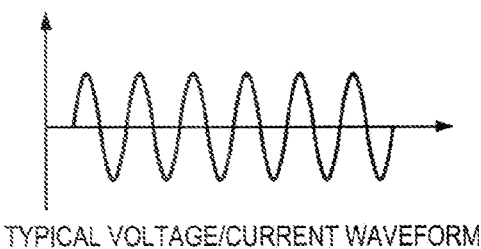
FIGS. 40-45 are graphical illustrations of various frequency and voltage patterns for forming the various flow patterns according to an embodiment of the present invention.
Figure 41:
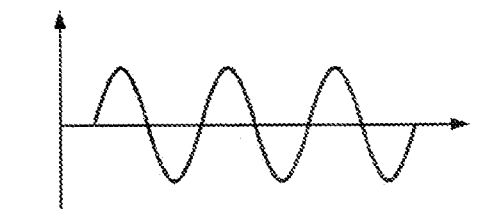
Figure 42:
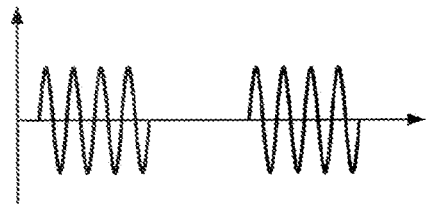
Figure 43:
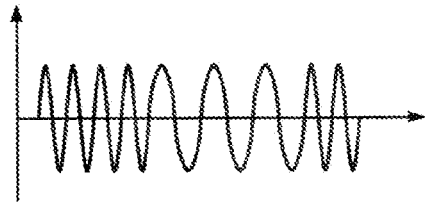
Figure 44:
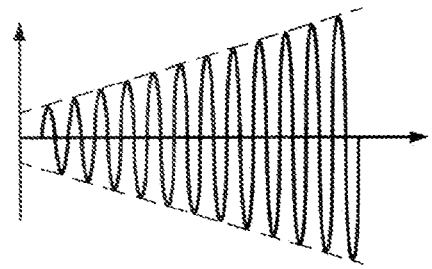
Figure 45:
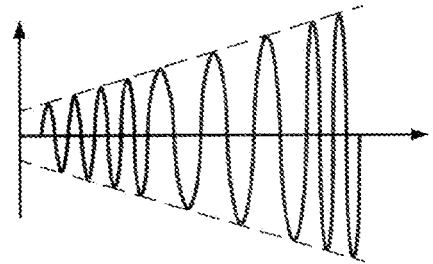
Figure 46:
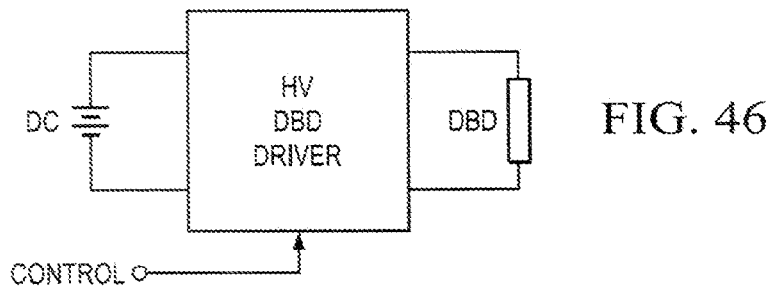
FIGS. 46-51 are schematic diagrams of various configurations of electrical circuits for driving the plasma regions of an electrode assembly labeled as DBD according to an embodiment of the present invention.
Figure 47:
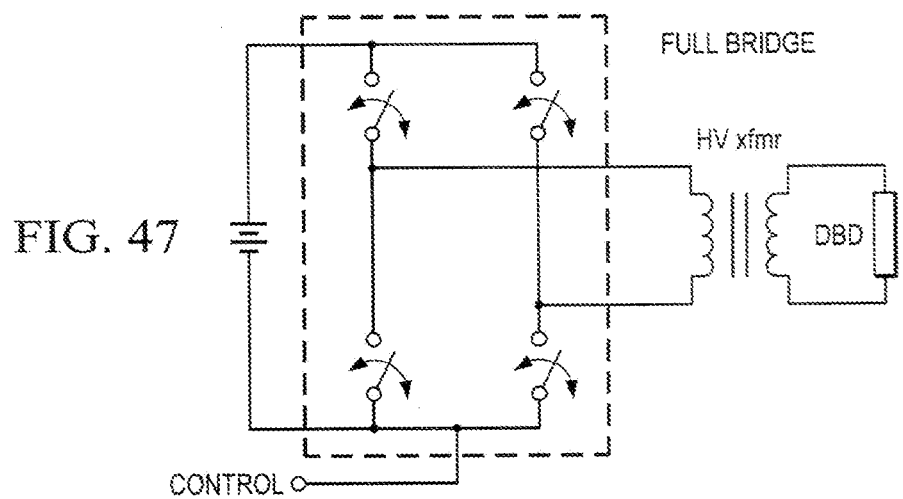
Figure 48:
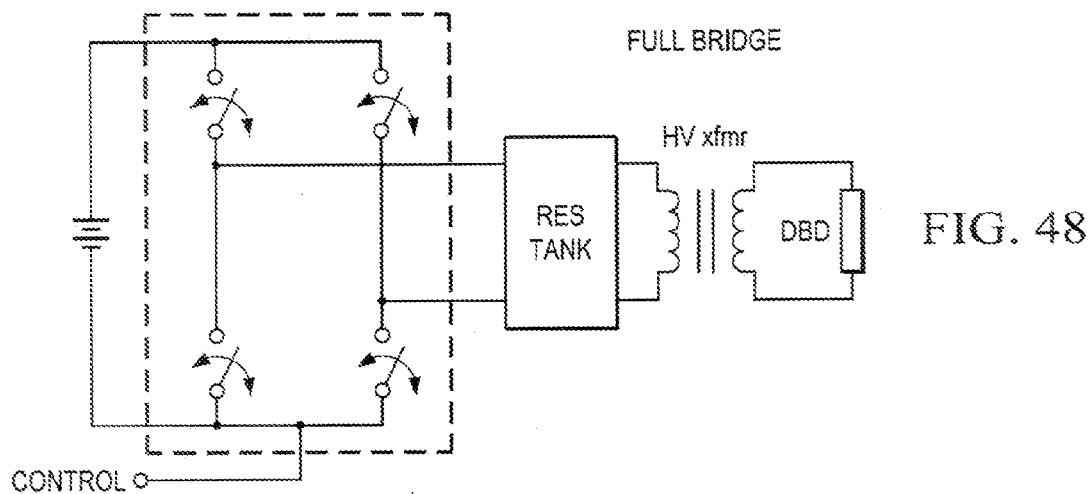
Figure 49:
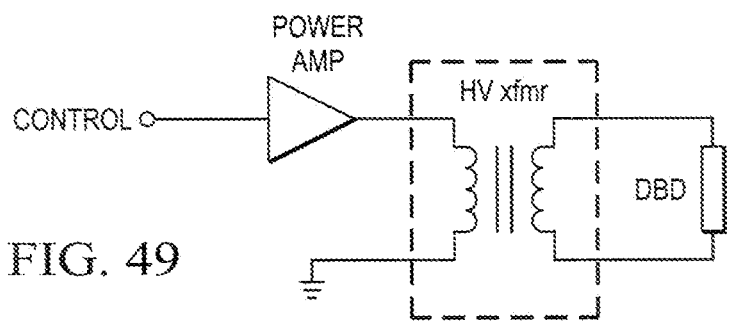
Figure 50:
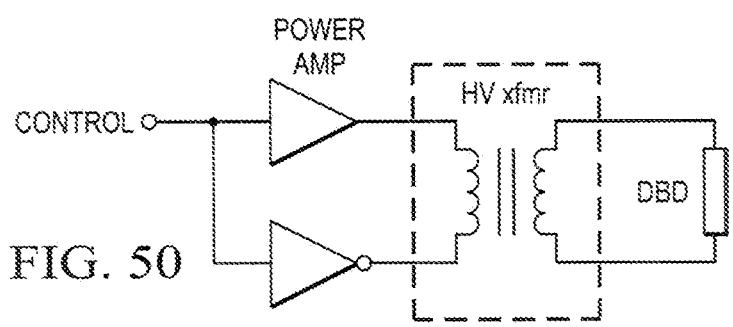
Figure 51:
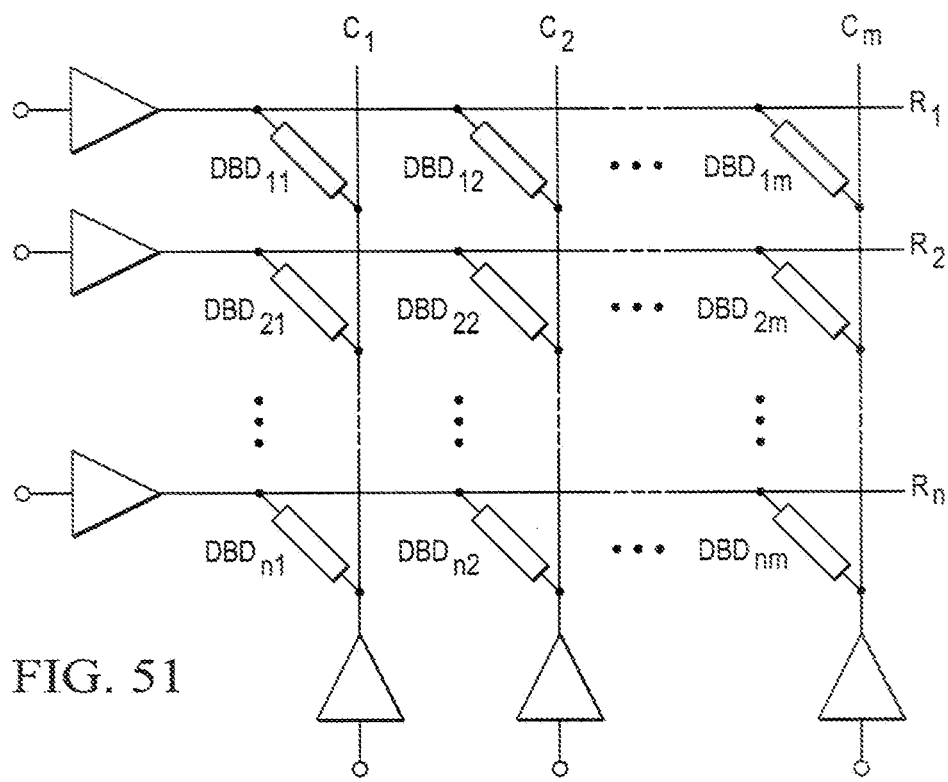

FIGS. 12, 26-31, and 32-39 illustrate various other embodiments of the present invention which provide different configurations of conductor arrays 73, 173, 273, 373, 473, 573, 673, 773. Particularly, FIG. 12 illustrates an example of a configuration of secondary or bottom electrodes 67 combined with or connected to conductor buses 71 of a conductor array 73. In FIGS. 26-31, electrode facing portions 167, 267, 367, 467, 567, 667, connect to electrodes 67 and connect to, or are integral with, conductor buses 171, 271, 371, 471, 571, 671. In FIG. 32, a single strip of electrode material is positioned beneath voids 61, which can comprise both the electrode layer 57 and conductor bus 771 to thereby form the secondary or bottom electrode 67'. In FIGS. 33-39, electrode facing portions 68, 168, 268, 368, 468, 568, 668 extend through the position of electrodes 67 illustrated, for example, in FIG. 11, to replace electrodes 67, thereby forming the secondary or bottom electrodes. Notably, in the preferred configurations, each of the conductor arrays 73, 173, 273, 373, 473, 573, 673, 773 are switchable via controller 40, to form various patterns, with the exception of conductor array 773 which would only be switchable either on or off. Beneficially, the various configurations, particularly those shown in FIGS. 31 and 39 can further allow individual selection between each of the DBD actuators 51.

Note, although illustrated in a same plane, one of ordinary skill in the art would understand that the various electrodes 67 and 67', and electrode facing portions 68, 168, 268, 368, 468, 568, and 668, and/or the conductor buses 71, 171, 271, 371, 471, 571, 671, 771 may be stacked on or within the dielectric material 53 in such a manner that one or more are separated at various levels to thereby provide additional flow structure patterns.

Referring again to FIGS. 1, 11, 13, 26-39, and 46-51, illustrated are control and feedback system components configured to provide active flow control according to an example of an embodiment of the present invention. In the exemplary configuration, the apparatus 30 includes a controller 40 operably coupled, e.g., to the electrically switchable conductor arrays 73, 173, 273, 373, 473, 573, and 673, and configured to modulate both voltage and/or frequency (see, e.g., FIGS. 40-45) to control formation of the plurality of different (e.g. irregular primarily vertical) flow patterns see, e.g., FIGS. 14-22) through selective application of different combinations of active plasma regions (illustrated at 61) for the plasma actuators 51 provided via the combination of voids 61 in the primary electrode 55, secondary electrodes 67, 67', and/or electrode facing/substitute portions 68, 168, 268, 368, 468, 568, 668, and 67', and conductor buses 71, 171, 271, 371, 471, 571, 671, and 771, to produce a vertical flow component, and through selective activation of the secondary electrodes 67, 67', and/or electrode facing/substitute portions 68, 168, 268, 368, 468, 568, 668, and 67', and conductor buses 71, 171, 271, 371, 471, 571, 671, and 771, at least partially offset from a center of the voids 61 and/or additional voids 63 to produce a horizontal flow component to thereby control formation of the plurality of different (e.g. irregular, primarily horizontal) hybrid flow patterns.

Apparatus 30 also includes a plurality of static pressure taps 39 at least positioned adjacent the station line associated with flow separation, but preferably distributed amongst or adjacent to electrode assembly 31, particularly where multiple assemblies are utilized. The apparatus 30 also includes a corresponding plurality of sensors 37 as known to those skilled in the art, each in fluid communication with at least one of the pressure taps 39.

According to an embodiment of the apparatus 30, the sensors 37 can be wireless sensors distributed along the outer surface of the airfoil or other aerodynamic structure 33, receiving power from the environment via energy harvesting or from a transceiver (not shown) interfaced with controller 40. According to another embodiment of the apparatus 30, the sensors 37 can be connected via optical fiber or electrical wire embedded in the aerodynamic structure 33. Note, in the wireless or wireline configuration having the pressure sensing portion of the sensors 37 located below the surface of the structure 33, the pressure taps 39 can take the form of a recess or tunnel (not shown). In a wireless or wireline configuration having the pressure sensing portion of the sensors 37 exposed to the surface of the structure 33, the pressure taps 39 take the form of the surface exposure between the sensing portion of the sensors 37 and the fluid flow 35.

The controller 40 can be operably wirelessly coupled or coupled via wire/optical line connection to each of the pressure sensors 37 and to each of the actuators 51, and can be configured to determine the static pressure within the array in response to signals received from the pressure sensors 37 and to automatically and continuously control the flow momentum and/or velocity of at least a subset of the plasma regions of each actuator 51 and/or a subset of the actuators 51 responsive to the determined static pressure or pressures. Further, particularly in configurations where there are multiple rows of electrode assemblies 31, the controller 40 can also be configured to automatically and continuously determine a station location of the expected point of incipient separation responsive to the determined static pressure and responsive to the determined location of the expected point of incipient separation, to automatically and continuously control the flow of at least a subset of the plasma regions and/or actuators 51 most affecting the flow at the point of incipient separation.

According to an embodiment of the present invention, the controller 40 is configured to perform the operations of: determining an aerodynamic flight profile representing an expected level of crossflow in the boundary layer flow across the aerodynamic structure 33, and selectively adjusting a pattern of activated plasma regions in response thereto to thereby effectively adjust spacing between active plasma regions (see, e.g., FIGS. 14-22). The selective adjustments can include decreasing the effective spacing between activated plasma regions, for example, when encountering flow having a higher Reynolds chord number than a certain value, and increasing the effective spacing between activated plasma regions when encountering boundary layer flow having a lower Reynolds number than the certain value. According to an exemplary configuration, progressively decreasing the effective spacing between activated plasma regions is performed when encountering boundary layer flow having corresponding progressively higher Reynolds chord numbers greater than approximately 1.0e6, and progressively increasing the effective spacing in is performed when encountering boundary layer flow having corresponding progressively lower Reynolds chord numbers lower than approximately 1.0e6. Note, utilization of other Reynolds chord values as a transition point between increasing and decreasing the effective spacing between plasma regions, is, however, within the scope of the present invention.

The controller 40 can correspondingly include a processor 101, memory 103 operably coupled to the processor 101, and firmware, program product, or other software 105 stored in the memory 103 configured for providing such functions. Note, although controller 40 is described as being in contact with the various electronic components to include the actuators 41, 51, and the sensors 37, one of ordinary skill in the art would understand that various electronic circuit interfaces may be coupled therebetween. For example, FIGS. 46-51 illustrate various examples of circuits for driving the individual plasma regions of actuator 51 of the electrode assembly 31.

Various embodiments of the present invention also beneficially include methods of forming electrode assembly 31 of apparatus 30 to thereby control boundary layer flow across the airfoil or other aerodynamic structure. By way of background, one of the easiest methods of applying metal to a dielectric has been to use an adhesive-backed metal foil, which would be attached to the dielectric. More recently, however improved methodologies have included the use of Physical-Vapor-Deposition (PVD) such as sputtering, or electroplating. Through experimentation, when employed to produce the featured electrode assembly 31, these deposition techniques have been shown to provide at least two main advantages. The first is that a variety of complex-electrode patterns can be constructed such that the opposing electrode geometries match on either sides of the dielectric material 53; and second, the electrodes 55, 67, and electrode later 57 can be produced with very low thickness, reducing extraneous flow interactions resulting from physical disruption caused by the upper electrode 55, itself. Typically the choice of deposition method between the two is driven by the desired thickness and geometries of the electrodes 55, 67 and electrode later 57.

Figure 52:
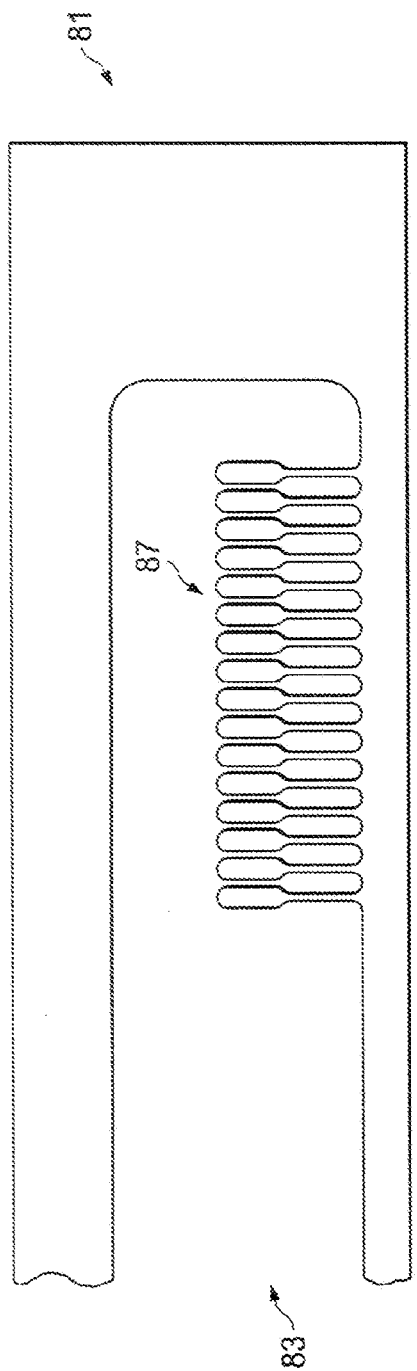
FIG. 52 is a planar view of a mask utilized to form a top electrode layer of an electrode assembly according to an embodiment of the present invention.

The electrode-pattern-fabrication typically begins with drawings of the desired pattern, also referred to as artwork, that is converted to some type of physical or virtual stencil, such as, for example, mask 81 shown in FIG. 52. Below are descriptions of two types of methods used, the first, known as sputtering, which has been extensively used in the production of prototypes of the electrode assembly 31, employs a physical mask 81, while the second method, known as photolithography, may employ either the physical mask 81 or a virtual mask (not shown).

Figure 53:
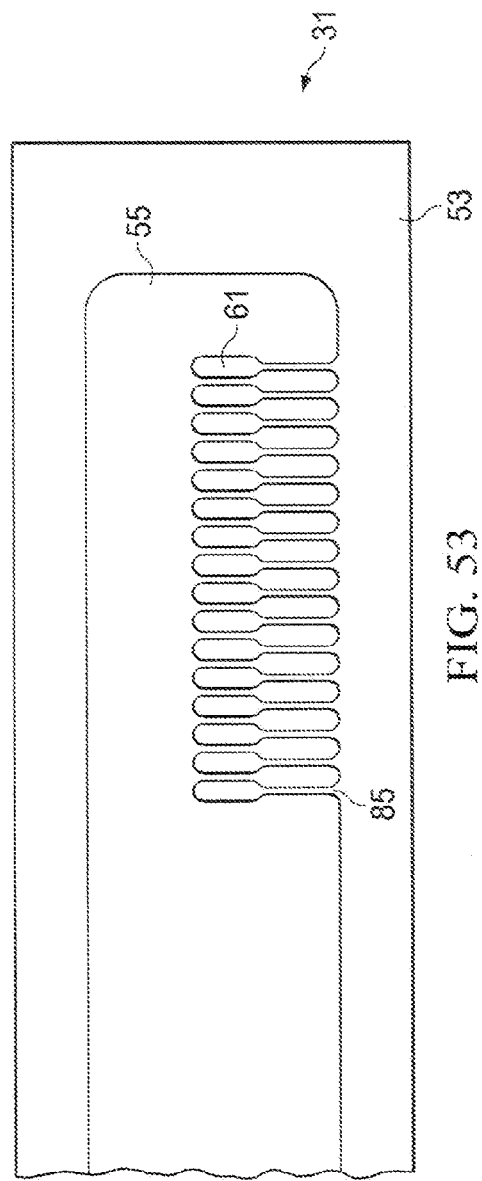
FIG. 53 is a top planar view of a top electrode formed through application of the mask of FIG. 52 according to an embodiment of the present invention.

Sputtering:

This method closely resembles a stenciling technique, which employs mask 81, or several masks, with an opening or openings 83 in the mask 81 configured to pass the electrode material through to the dielectric 55 (or substrate) in the desired pattern. The opening 83 represent the perimeter and void geometries of the electrode 55 that is to be used. The mask 81 is laid over the dielectric 53 prior to application of the material forming the electric 55. As perhaps best shown in FIG. 53, the electrode 55 with voids 61 is then built slowly. Different materials as known to those of ordinary skill in the art can be employed to promote adhesion of the electrode material to the dielectric material 53. Note, according to the illustrated embodiment of the mask 81, breaks 85 occur in the electrode 55 due to the physical need of connecting the voids portion 87 of the pattern to the rest of the mask 81. The breaks 85 in the electrode 55, however, can be eliminated by creating another mask (not shown) to fill in the gaps caused by the breaks 85.

Figure 54:
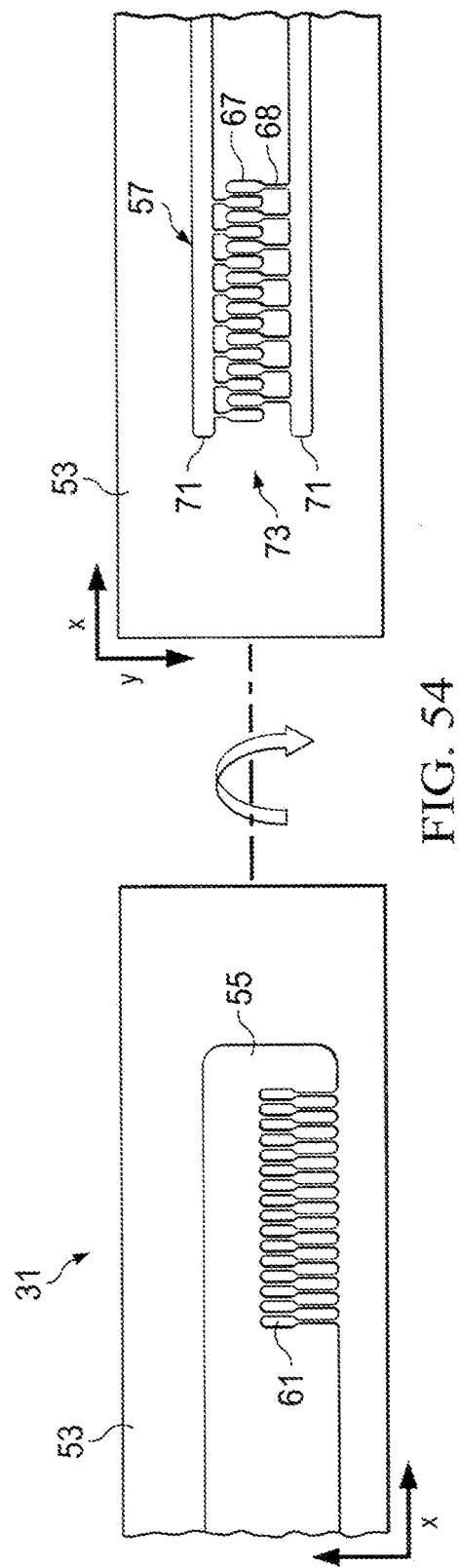
FIG. 54 is a comparative planar view of both the top and bottom electrode layers according to an embodiment of the present invention.

Masks 81 and necessary framework can be fabricated with location holes (not shown) to match the top side electrode pattern with the bottom side electrode pattern on either side of the dielectric 53, creating opposing matching geometries. FIG. 54 illustrates the top (left portion of the illustration) and bottom (right portion of the illustration) of the electrode assembly 31 after completion of the sputtering or the electrode layer 55 including voids 61, electrode layer 57 including electrodes 67 and conductor array 73 including electrode facing portion 68 and conductor buses 71.

Photolithography

This method closely resembles the sputtering method but with added complexity potentially offset by an added advantage of drawing the electrode patterns with a laser (not shown). This allows for a virtual mask (not shown) to be created and can eliminate breaks 85 in the electrodes resulting from the physical limitations of the mask 81. According to an exemplary embodiment of the method, a UV laser (or lamp) exposes photoresist material, which depending on the type, i.e., negative or positive, becomes insoluble or soluble to the photoresist developer. A basic outline of how these two different types of photoresist are employed, follows:

---
Negative resist:
---

1. Begin with a dielectric with the electrode-material covering the whole surface at the necessary thickness.
2. Cover with the negative resist.
3. Expose the photoresist in the desired electrode-pattern/geometry (becomes insoluble to developer)
4. Remaining unexposed photoresist is removed, exposing the metal underneath that is now removed by a wet etch process.
5. Exposed photoresist is removed leaving finally the desired electrode pattern ---
Positive resist:
---

1. Begin with a bare dielectric.
2. Cover with positive resist.
3. Expose by UV in the desired pattern (becomes soluble to the developer).
4. Exposed photoresist is removed and exposes sections of dielectric in the correct pattern.
5. The electrode-material is deposited onto the dielectric.
6. The remaining photoresist (now covered with electrode-material) is removed and the desired electrode pattern is left on the dielectric.

Various embodiments of the present invention also include methods of providing distributed flow control actuation to manage the behavior of a global flow field. For example, such a method can include the steps of connecting one or more electrode assemblies 31 to a surface of an aerodynamic structure 33 to be in fluid contact with a primary fluid flow structure 35 when operationally flowing, and altering a secondary flow structure to manipulate fluid behavior of the primary flow structure 33 to thereby mitigate cross-flow instabilities to maintain a laminar flow—thereby reducing drag and potentially increasing fuel efficiency. Cross-flow instabilities are particularly troublesome on swept wing aircraft. Transition from laminar flow to turbulent flow occurs earlier (upstream) on a swept back wing than for a non-swept wing. This transition occurs due to the cross-flow instabilities that interact with each other, and grow. This method beneficially provides the flow structure 35 over the wing with regions for the vortices caused by the cross-flow instability to attach, thus, stabilizing the flow.

According to an exemplary embodiment of the method, at least one electrode assembly 31 including at least one row of plasma regions is positioned so that at least a subset of the plasma regions of at least one actuator 41, 51 is positioned adjacent a station line located at an expected point of incipient separation of at least portions of the primary flow structure 35 from the surface of the aerodynamic structure 33. In an exemplary configuration, the dielectric layer 43, bottom electrode layer 57, and any additional insulating layer or material 50 of the electrode assembly 31 is embedded or otherwise attached to the surface of the aerodynamic structure 33, with only the upper electrode 55 extending above the natural surface of the aerodynamic structure 33. Notably, as the total thickness is generally less than 0.5 microns, electrode assembly 31 is expected to render only negligible flow disruption when no power is being supplied to the assembly 31. In an alternative configuration, the entire electrode assembly 31 is connected to and above (on) the natural surface of the aerodynamic structure 33. In yet another alternative configuration, the top of the upper electrode 55 is flush with the natural surface of the aerodynamic structure 33.

Further, when multiple rows of plasma regions are employed, a subset of the plasma regions of at least one actuator 41, 51, can be longitudinally positioned substantially upstream of the expected point of incipient separation to allow selective activation in front of, at, and after the expected point of incipient separation which is expected to vary depending upon the specific operational profile that the aerodynamic structure 33 is subjected to.

It is important to note that while the foregoing embodiments of the present invention have been described in the context of a fully functional system and process, those skilled in the art will appreciate that the mechanism of at least portions of the present invention and/or aspects thereof are capable of being distributed in the form of a computer readable medium in a variety of forms storing a set of instructions for execution on a processor, processors, or the like, and that embodiments of the present invention apply equally regardless of the particular type of media used to actually carry out the distribution. Examples of the computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk, drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions. Such media can contain, for example, both operating instructions and the operations instructions related to the program product/software 105, and the computer/processor/controller implementable method steps/operations, described above.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:
1. An apparatus for controlling boundary layer flow across an aerodynamic structure, the apparatus comprising a dielectric-barrier-discharge electrode assembly to be connected to a surface of an aerodynamic structure, the electrode assembly comprising:
   an insulating dielectric layer having an environmental fluid facing surface defining a top surface and an aerodynamic structure facing surface defining a bottom surface;
   a first electrode layer positioned in contact with the top surface of the insulating dielectric layer and having a plurality of oblong voids extending therethrough, each oblong void substantially completely surrounded by a portion of the first electrode layer, the portion of the first electrode substantially completely surrounding each respective one of the plurality of oblong voids substantially defining a perimeter of an extent of the respective oblong void; and a second electrode layer comprising a plurality of separate and spaced apart oblong electrodes defining a plurality of secondary electrodes positioned in contact with the bottom surface of the insulating dielectric layer so that the insulating dielectric layer is positioned between at least substantial portions of the first electrode layer and each of the plurality of spaced apart secondary electrodes, each of the plurality of secondary electrodes positioned beneath a separate one of the plurality of oblong voids to complement the respective separate one of the plurality of oblong voids and positioned laterally substantially within confines of a normal extending along the perimeter of the respective complementing separate one of the plurality of oblong voids;

the portion of the first electrode defining the perimeter of the extent of the respective oblong void, the complementing secondary electrode associated therewith, and a respective adjacent portion of the dielectric layer positioned between the surrounding portion of the first electrode and the complementing secondary electrode forming a separate active plasma region of a plurality of active plasma regions, each plasma region dimensioned so that when activated the respective plasma region functions to impart a net velocity to the surrounding environmental fluid having a substantial vertical component normal to and extending away from the portion of the top surface of dielectric layer within the respective oblong void.

2. The apparatus as defined in claim 1, wherein the plurality of active plasma regions form active portions of a plasma actuator, and wherein each plasma region is dimensioned so that when activated, the respective plasma region functions to impart a net velocity to the surrounding environmental fluid which is primarily substantially normal to the portion of the dielectric layer immediately below the respective oblong void.

3. The apparatus as defined in claim 1, wherein the perimeter of each oblong void is substantially pill shaped.

4. The apparatus as defined in claim 1, wherein an outer surface perimeter of each oblong electrode is substantially pill shaped.

5. The apparatus as defined in claim 1, wherein each oblong void has a length and a width, and wherein the width is a minimum of approximately 1 mm to thereby provide sufficient acceleration to the surrounding environmental fluid.

6. The apparatus as defined in claim 1, further comprising a controller configured to perform the operations of:
determining an aerodynamic flight profile representing an expected level of crossflow in the boundary layer flow across the aerodynamic structure; and
selectively adjusting a pattern of activated plasma regions to thereby effectively adjust spacing between active plasma regions responsive to variations in the level of crossflow, decreasing the effective spacing between activated plasma regions when encountering flow having a higher Reynolds chord number than a certain value, and
increasing the effective spacing between activated plasma regions when encountering boundary layer flow having a lower Reynolds chord number than the certain value.

7. The apparatus as defined in claim 1, further comprising:
a controller configured to perform the operation of selectively adjusting a pattern of activated plasma regions to thereby effectively adjust spacing between active plasma regions.

8. The apparatus as defined in claim 7, further comprising:
at least one sensor in communication with the controller; and
wherein the operation of selectively adjusting a pattern of activated plasma regions is performed responsive to sensor data indicating a current operational flight profile.

9. The apparatus as defined in claim 8, wherein the operation selectively adjusting a pattern of activated plasma regions performed by the controller comprises the operations of:
decreasing the effective spacing between activated plasma regions when encountering boundary layer flow having a higher Reynolds chord number than 1.0e6; and
increasing the effective spacing between activated plasma regions when encountering boundary layer flow having a lower Reynolds chord number than 1.0e6.

10. The apparatus as defined in claim 1, further comprising:
at least one electrically switchable conductor array positioned to provide electrical current to at least a subset of the plurality of secondary electrodes to thereby produce a plurality of different flow patterns; and
a controller operably coupled to the at least one electrically switchable conductor array and configured control formation of the plurality of different flow patterns.

11. The apparatus as defined in claim 10,
wherein the plurality of different flow patterns is a plurality of selectively irregularly shaped flow patterns; and
wherein the controller is further configured to modulate both voltage and frequency to control formation of the plurality of selectively irregularly shaped flow patterns.

12. The apparatus as defined in claim 1,
wherein each oblong void has a length and a width at least partially defining a void surface area for the respective oblong void;
wherein each secondary electrode has a dielectric layer-facing surface having a length and a width at least partially defining a surface area of an entire extent of the dielectric layer-facing surface for the respective secondary electrode; and
wherein each secondary electrode is configured so that the surface area of the entire extent of the dielectric layer-facing surface is smaller than the void surface area of the complementing oblong void.

13. The apparatus as defined in claim 1,
wherein each oblong void has a length and a width at least partially defining a void surface area for the respective oblong void;
wherein each secondary electrode has a dielectric layer-facing surface having a length and a width at least partially defining a surface area of an entire extent of the dielectric layer-facing surface for the respective secondary electrode; and
wherein a relative size differential between the void area of each oblong void and the surface area of the dielectric layer-facing surface of its complementing secondary electrode is at least partially characterized by the following:
the length of each oblong void is substantially larger than the length of the dielectric layer-facing surface of the associated complementing secondary electrode, and the width of each oblong void is substantially larger than the width of the dielectric layer-facing surface of the associated complementing secondary electrode.

14. The apparatus as defined in claim 1
wherein each separate oblong void of the plurality of oblong voids is oriented approximately parallel to each other of the plurality of oblong voids; and
wherein each separate oblong void of the plurality of oblong voids is spaced apart from the each other of the plurality of oblong voids at a distance of between approximately 2.0 mm and 2.75 mm.

15. The apparatus as defined in claim 1, wherein the first electrode has a thickness of no more than approximately 1.0 microns to thereby render negligible unactivated flow stream disruption resulting from application of the dielectric barrier discharge electrode assembly to the aerodynamic structure.

16. The apparatus as defined in claim 1, further comprising:
additional dielectric material positioned in contact with the top surface of the insulating dielectric and between adjacent portions of the first electrode layer to suppress unwanted discharge regions.

17. The apparatus as defined in claim 1, wherein the plurality of plasma regions is a first plurality of plasma regions;

wherein the first electrode layer further includes a plurality of additional voids positioned along and extending from an outer perimeter edge of the first electrode layer;

wherein the second electrode layer comprises at least one portion positioned at least partially offset from a center of the additional plurality of voids to thereby form a second plurality of plasma regions; and wherein each plasma region of the second plurality of plasma region is dimensioned so that when activated the respective plasma region functions to impart a net velocity to the surrounding environmental fluid which is primarily substantially tangential to the portion of the dielectric layer immediately below the respective additional void.

18. An apparatus for controlling boundary layer flow across an aerodynamic structure, the apparatus comprising:

a dielectric-barrier-discharge electrode assembly integrated with a surface of an aerodynamic structure, the electrode assembly comprising:

an insulating dielectric layer having an environmental fluid facing surface defining a top surface and an aerodynamic structure facing surface defining an bottom surface, a first electrode layer positioned in contact with the top surface of the insulating dielectric layer and having a plurality of oblong voids extending therethrough, each oblong void substantially completely surrounded by a portion of the first electrode layer, the portion of the first electrode substantially completely surrounding each respective one of the plurality of oblong voids substantially defining a perimeter of an extent of the respective oblong void, the perimeter of each oblong void being substantially pill shaped, a surface area of the top surface of the insulating dielectric layer within the perimeter of each respective oblong void defining a void area for the respective oblong void, and a second electrode layer comprising a plurality of separate and spaced apart oblong electrodes defining a plurality of secondary electrodes positioned in contact with the bottom surface of the insulating dielectric layer so that the insulating dielectric layer is positioned between at least substantial portions of the first electrode layer and each of the plurality of spaced apart secondary electrodes, each of the plurality of secondary electrodes positioned beneath a separate one of the plurality of oblong voids to complement the respective separate one of the plurality of oblong voids and positioned laterally substantially within confines of a normal extending along the perimeter of the respective complementing separate one of the plurality of oblong voids, each secondary electrode including a dielectric layer-facing surface being substantially pill shaped, a surface area of an entire extent of the dielectric layer-facing surface for the respective secondary electrode being substantially smaller than the void area of the associated complementing oblong void, the portion of the first electrode defining the perimeter of the extent of the respective oblong void, the complementing secondary electrode associated therewith, and a respective adjacent portion of the dielectric layer positioned between the surrounding portion of the first electrode and the complementing secondary electrode forming a separate active plasma region of a plurality of active plasma regions, each plasma region dimensioned so that when activated the respective plasma region functions to impart a net velocity to the surrounding environmental fluid which is primarily substantially normal to the portion of the dielectric layer immediately below the respective oblong void; and a controller configured to perform the operations of:

determining a level of turbulence of the boundary layer flow across at least portions of the aerodynamic structure, and selectively adjusting a pattern of activated plasma regions to thereby effectively adjust spacing between active plasma regions responsive to variations in the level of turbulence, decreasing the effective spacing between activated plasma regions when encountering boundary layer flow having a higher Reynolds chord number than a certain value and increasing the effective spacing between activated plasma regions when encountering boundary layer flow having a lower Reynolds chord number than the certain value.

19. A method of controlling boundary layer flow across an airfoil, the method comprising the steps of:

applying a first electrode layer to a first surface of an insulating dielectric layer defining a top surface of the insulating dielectric layer, the first electrode layer configured with a plurality of oblong voids extending therethrough, each oblong void substantially completely surrounded by a portion of the first electrode layer, the portion of the first electrode substantially completely surrounding each respective one of the plurality of oblong voids substantially defining a perimeter of an extent of the respective oblong void; and applying a second electrode layer to a second surface of the insulating dielectric layer opposite the first surface defining a bottom surface of the insulating dielectric layer, the second electrode layer shaped to form a plurality of separate and spaced apart oblong electrodes defining a plurality of secondary electrodes, each of the plurality of secondary electrodes positioned beneath a separate one of the plurality of oblong voids to complement the respective separate one of the plurality of oblong voids and positioned laterally substantially within confines of a normal extending along the perimeter of the respective complementing oblong void;

the portion of the first electrode defining the perimeter of the extent of the respective oblong void, the complementing secondary electrode associated therewith, and a respective adjacent portion of the dielectric layer located between the surrounding portion of the first electrode and the complementing secondary electrode forming a separate active plasma region of a plurality of active plasma regions of a dielectric-barrier-discharge electrode assembly, each plasma region dimensioned so that when activated the respective plasma region functions to impart a net velocity to the surrounding environmental fluid having a substantial vertical component normal to and extending away from the portion of the top surface of dielectric layer within the respective oblong void.

20. The method as defined in claim 19, wherein each plasma region is dimensioned so that when activated, the respective plasma region functions to impart a net velocity to the surrounding environmental fluid which is primarily substantially normal to the portion of the dielectric layer immediately below the respective oblong void.

21. The method as defined in claim 19,
wherein the perimeter of each oblong void is substantially pill shaped;
wherein each oblong void has a length and a width;
wherein an outer surface perimeter of each oblong electrode is substantially pill shaped;
wherein each secondary electrode has a length and a width; and
wherein the width of each oblong void is greater than the width of its respective complementing secondary electrode.

22. The method as defined in claim 19,
wherein each oblong void has a length and a width at least partially defining a void area for the respective oblong void; and
wherein each secondary electrode has a dielectric layer-facing surface having a length and a width at least partially defining an entire extent of a surface area of the dielectric layer-facing surface for the respective secondary electrode,
the entire extent of the surface area of the dielectric layer-facing surface of each oblong electrode being shaped to be substantially smaller than the void area of the associated complementing oblong void.

23. The method as defined in claim 19,
wherein the step of applying a first electrode layer to a first surface of an insulating dielectric layer includes applying the first electrode layer so that the first electrode layer has a thickness of no more than approximately 1.0 microns to thereby render negligible unactivated flow stream disruption resulting from the dielectric barrier discharge electrode assembly being connected to the surface of the airfoil; and
wherein the method further, comprises the step of connecting the dielectric-barrier-discharge electrode assembly a surface of an airfoil.

24. The method as defined in claim 19, further comprising the steps of:
applying an electrically switchable conductor array to the bottom surface of the insulating dielectric layer to provide electrical current to at least a subset of the plurality of secondary electrodes to thereby produce a plurality of different flow patterns; and
producing a plurality of different flow patterns, each different flow pattern associated with a different airfoil operational condition.

25. The method as defined in claim 24, wherein the step of producing a plurality of different flow patterns includes the steps of:
decreasing effective spacing between activated plasma regions when encountering boundary layer flow having a higher Reynolds chord number than 1.0e6; and
increasing the effective spacing between activated plasma regions when encountering boundary layer flow having a lower Reynolds chord number than 1.0e6.

26. The method as defined in claim 24,
wherein the plurality of different flow patterns is a plurality of selectively irregularly shaped flow patterns; and
wherein the method further comprises the step of modulating both voltage and frequency to control formation of the plurality of selectively irregularly shaped flow patterns.

27. The method as defined in claim 19, further comprising the steps of:
sensing a level of turbulence of the boundary layer flow across at least portions of the aerodynamic structure, and
selectively adjusting a pattern of activated plasma regions to thereby effectively adjust spacing between active plasma regions responsive to variations in the level of turbulence, decreasing the effective spacing between activated plasma regions when encountering boundary layer flow having a higher Reynolds chord number than 1.0e6 and increasing the effective spacing between activated plasma regions when encountering boundary layer flow having a lower Reynolds chord number than 1.0e6.

28. The method as defined in claim 19, further comprising the step of:
applying an insulating dielectric material in contact with the top surface of the insulating dielectric and between adjacent portions of the first electrode layer to suppress unwanted discharge regions.

29. The method as defined in claim 19,
wherein the plurality of plasma regions is a first plurality of plasma regions;
wherein the first electrode layer is further configured with a plurality of additional voids positioned along and extending from an outer perimeter edge of the first electrode layer;
wherein the second electrode layer is further configured with at least one portion positioned at least partially offset from a center of the additional plurality of voids to thereby form a second plurality of plasma regions;
wherein each plasma region of the second plurality of plasma regions is dimensioned so that when activated the respective plasma regions functions to impart a net velocity to the surrounding environmental fluid which is primarily substantially tangential to the portion of the dielectric layer immediately below the respective additional void; and
wherein the method further comprises adjusting a pattern of active plasma regions of the first plurality of plasma regions in combination with a pattern of active plasma regions of the second plurality of plasma regions to control a net direction and velocity of the flow created by the first and the second plurality of plasma regions.

* * * * *